(12) United States Patent
Yan et al.

(10) Patent No.: US 12,526,405 B2
(45) Date of Patent: Jan. 13, 2026

(54) ADAPTIVE CODING ORDER FOR INTRA PREDICTION IN VIDEO CODING

(71) Applicant: BEIJING DAJIA INTERNET INFORMATION TECHNOLOGY CO., LTD., Beijing (CN)

(72) Inventors: Ning Yan, San Diego, CA (US);
Xiaoyu Xiu, San Diego, CA (US);
Yi-Wen Chen, San Diego, CA (US);
Che-Wei Kuo, San Diego, CA (US);
Wei Chen, San Diego, CA (US);
Hong-Jheng Jhu, San Diego, CA (US);
Xianglin Wang, San Diego, CA (US);
Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/616,963

(22) Filed: Mar. 26, 2024

(65) Prior Publication Data
US 2024/0314302 A1 Sep. 19, 2024

Related U.S. Application Data

(63) Continuation of application No. PCT/US2022/044818, filed on Sep. 27, 2022.
(Continued)

(51) Int. Cl.
*H04N 19/00* (2014.01)
*H04N 19/105* (2014.01)
(Continued)

(52) U.S. Cl.
CPC .......... *H04N 19/11* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS

| 2013/0064292 A1 | 3/2013 | Song et al. |
| 2020/0260104 A1* | 8/2020 | Piao ............... H04N 19/159 |

(Continued)

FOREIGN PATENT DOCUMENTS

| EP | 3534607 A1 | 9/2019 |
| JP | 2018121319 A | 8/2018 |

OTHER PUBLICATIONS

International Search Report from related PCT Application No. PCT/US2022/044818 dated Jan. 26, 2023 (9 pages).
(Continued)

*Primary Examiner* — Zhihan Zhou
(74) *Attorney, Agent, or Firm* — Bayes PLLC

(57) ABSTRACT

Implementations of the disclosure provide a video processing apparatus and method for intra prediction in video coding with an adaptive coding order. The method may include receiving, by one or more processors, one or more reference blocks from a video frame of a video for performing intra prediction on a video block of the video frame. The method may include dividing, by the one or more processors, the video block into a plurality of video sub-blocks. The method may include determining, by the one or more processors, the adaptive coding order for the plurality of video sub-blocks. The method may include generating, by the one or more processors, a plurality of reconstructed sub-blocks for the plurality of video sub-blocks based on the adaptive coding order and the one or more reference blocks. The plurality of reconstructed sub-blocks form a reconstructed block for the video block.

20 Claims, 20 Drawing Sheets

Related U.S. Application Data

(60) Provisional application No. 63/249,013, filed on Sep. 27, 2021.

(51) Int. Cl.
*H04N 19/11* (2014.01)
*H04N 19/119* (2014.01)
*H04N 19/159* (2014.01)
*H04N 19/176* (2014.01)
*H04N 19/593* (2014.01)
*H04N 19/70* (2014.01)

(52) U.S. Cl.
CPC ......... *H04N 19/159* (2014.11); *H04N 19/176* (2014.11); *H04N 19/593* (2014.11); *H04N 19/70* (2014.11)

(56) References Cited

U.S. PATENT DOCUMENTS

2020/0280742 A1* 9/2020 Ramasubramonian ...................... H04N 19/593
2021/0006778 A1* 1/2021 Kim .................... H04N 19/129

OTHER PUBLICATIONS

1 Extended European Search Report in related European Application No. 22873728.4 dated Jul. 17, 2025 (11 pages).

\* cited by examiner

ADAPTIVE CODING ORDER FOR INTRA PREDICTION IN VIDEO CODING

CROSS-REFERENCE TO RELATED APPLICATION

This application is a continuation application of International Application No. PCT/US2022/044818, filed Sep. 27, 2022, which is based upon and claims priority to U.S. Provisional Application No. 63/249,013, filed Sep. 27, 2021, all of which are incorporated herein by reference in their entireties.

TECHNICAL FIELD

This application is related to video coding and compression. More specifically, this application relates to video processing apparatuses and methods for intra prediction in video coding with an adaptive coding order.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the present disclosure provide a video processing method for intra prediction in video coding with an adaptive coding order. The video processing method may include receiving, by one or more processors, one or more reference blocks from a video frame of a video for performing intra prediction on a video block of the video frame. The video processing method may also include dividing, by the one or more processors, the video block into a plurality of video sub-blocks. The video processing method may further include determining, by the one or more processors, the adaptive coding order for the plurality of video sub-blocks. The adaptive coding order indicates an order to code the plurality of video sub-blocks. The video processing method may additionally include generating, by the one or more processors, a plurality of reconstructed sub-blocks for the plurality of video sub-blocks based on the adaptive coding order and the one or more reference blocks. The plurality of reconstructed sub-blocks form a reconstructed block for the video block.

Implementations of the present disclosure also provide a video processing apparatus for intra prediction in video coding with an adaptive coding order. The video processing apparatus may include one or more processors and a memory coupled to one or more processors. The one or more processors may be configured to receive one or more reference blocks from a video frame of a video for performing intra prediction on a video block of the video frame. The one or more processors may also be configured to divide the video block into a plurality of video sub-blocks. The one or more processors may further be configured to determine the adaptive coding order for the plurality of video sub-blocks. The adaptive coding order indicates an order to code the plurality of video sub-blocks. The one or more processors may additionally be configured to generate a plurality of reconstructed sub-blocks for the plurality of video sub-blocks based on the adaptive coding order and the one or more reference blocks. The plurality of reconstructed sub-blocks form a reconstructed block for the video block.

Implementations of the present disclosure also provide a non-transitory computer-readable storage medium storing a bitstream to be decoded by a decoding method. The decoding method may include receiving one or more reference blocks from a video frame of a video for performing intra prediction on a video block of the video frame. The decoding method may also include dividing the video block into a plurality of video sub-blocks. The decoding method may further include determining the adaptive coding order for the plurality of video sub-blocks. The adaptive coding order indicates an order to code the plurality of video sub-blocks. The decoding method may additionally include generating a plurality of reconstructed sub-blocks for the plurality of video sub-blocks based on the adaptive coding order and the one or more reference blocks. The plurality of reconstructed sub-blocks form a reconstructed block for the video block.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Figure 1:
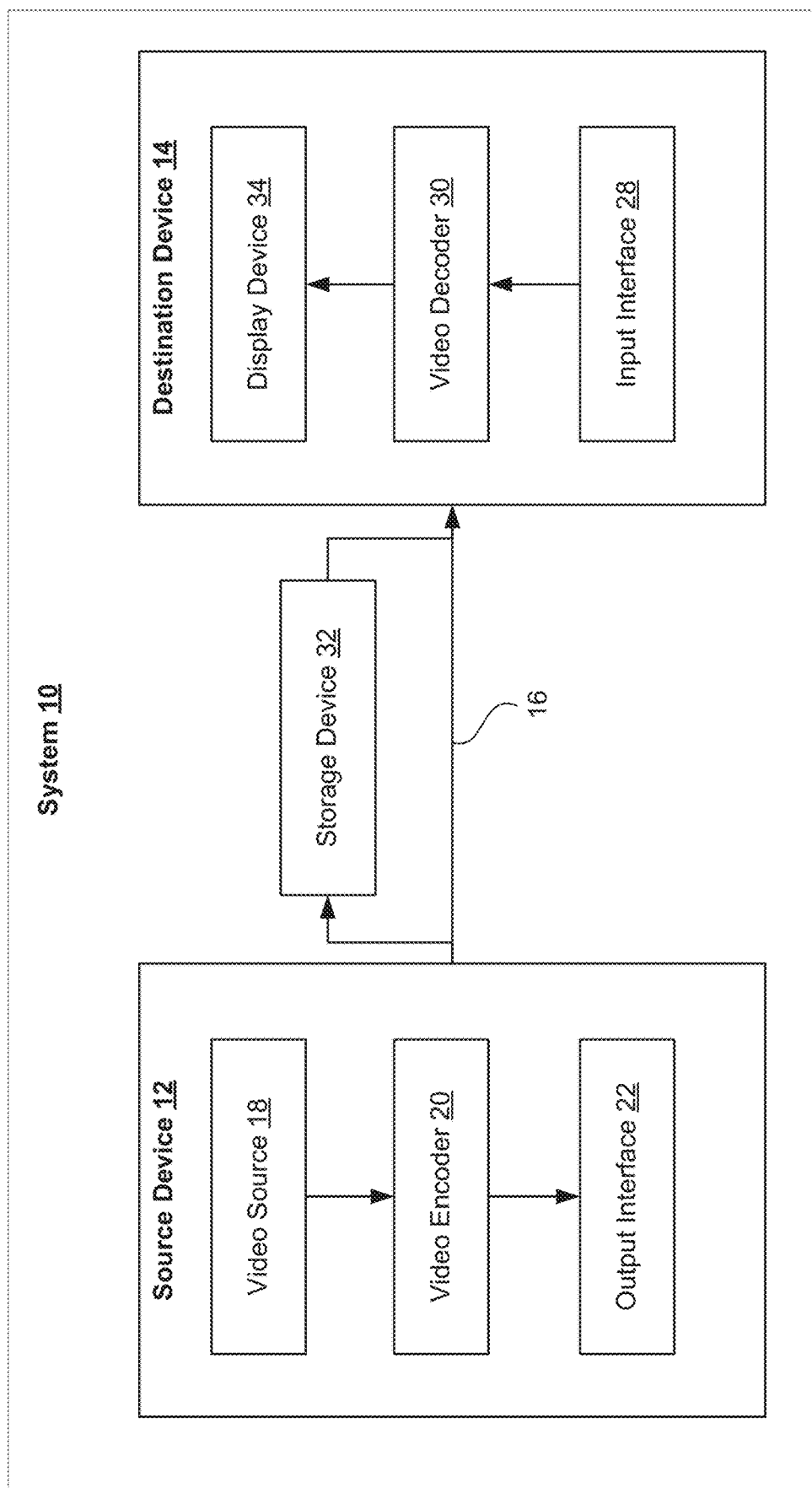
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
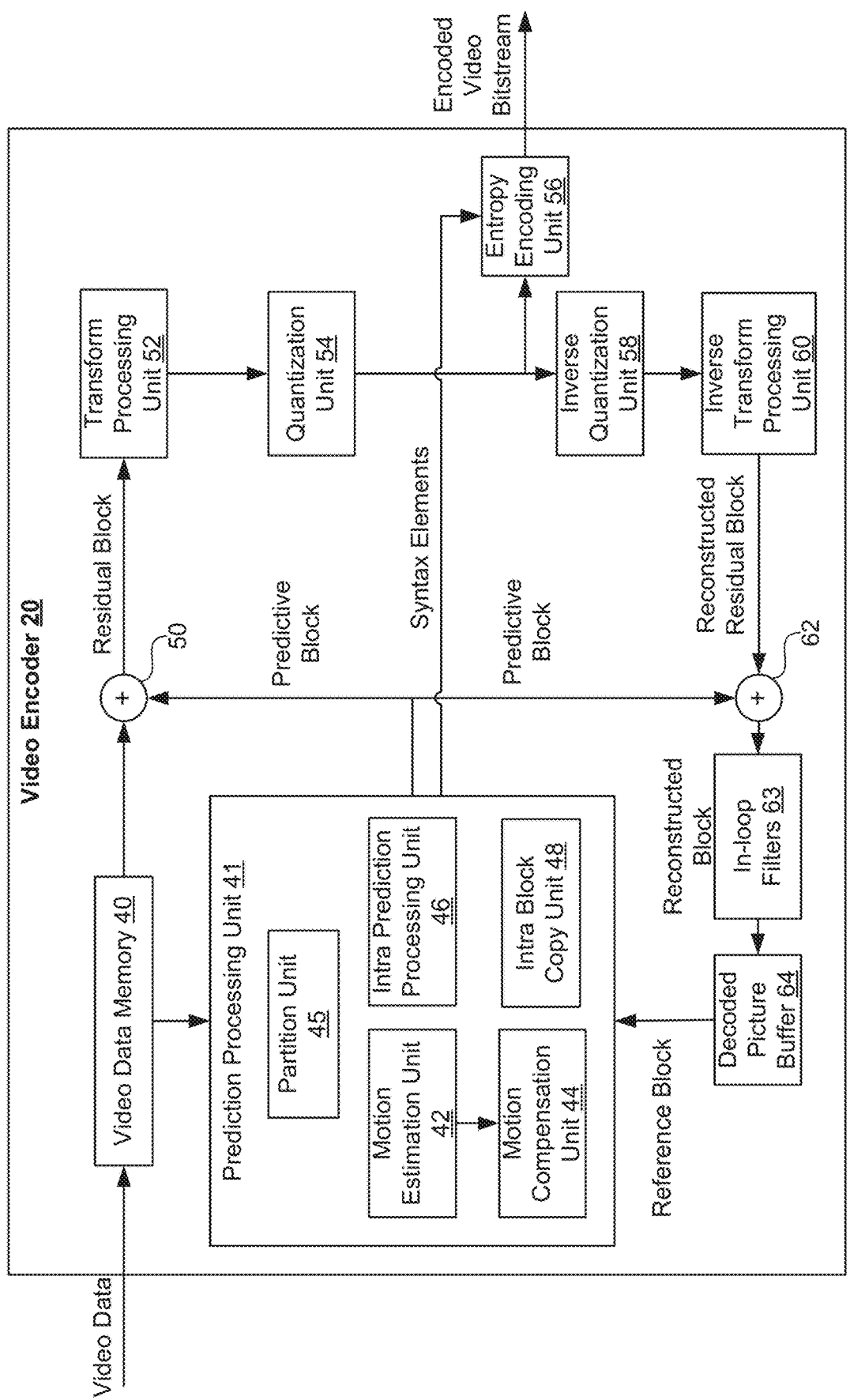
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values.

A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
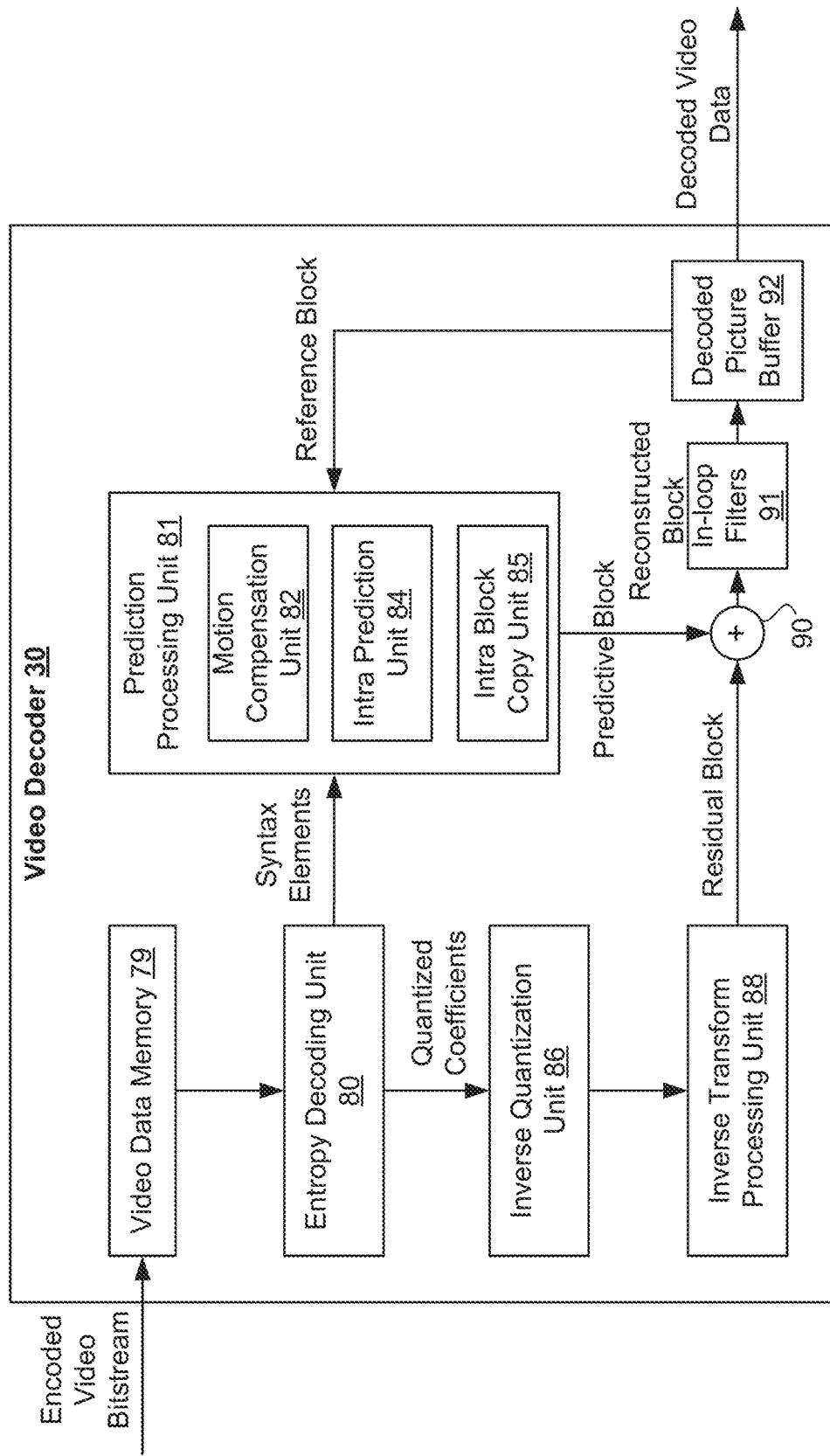
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
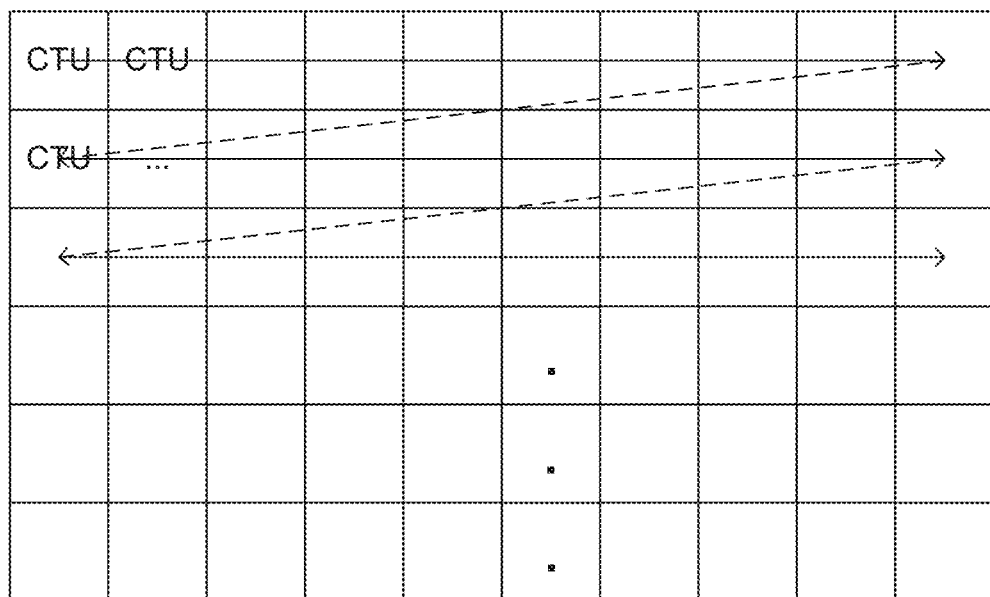
FIGS. 4A through 4E are graphical representations illustrating how a frame is recursively partitioned into multiple video blocks of different sizes and shapes in accordance with some implementations of the present disclosure.
Figure 4B:
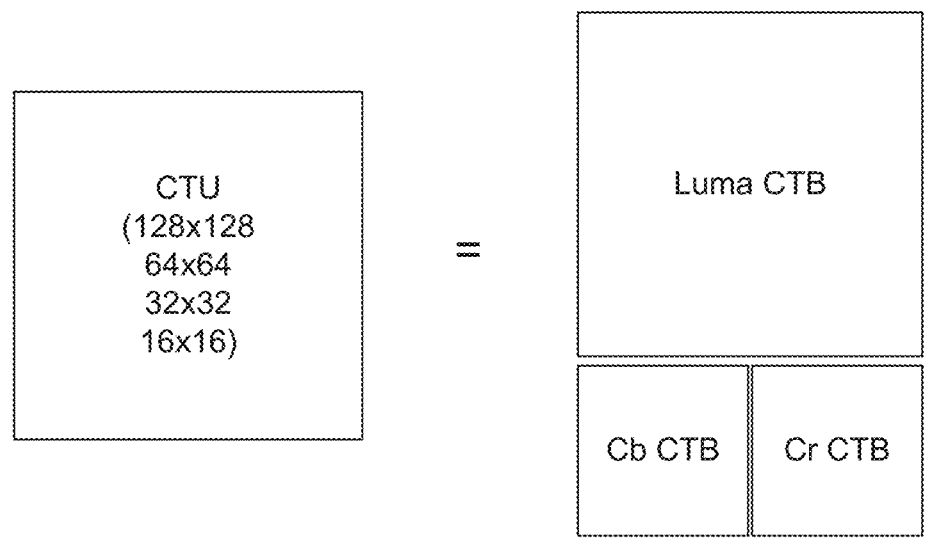

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
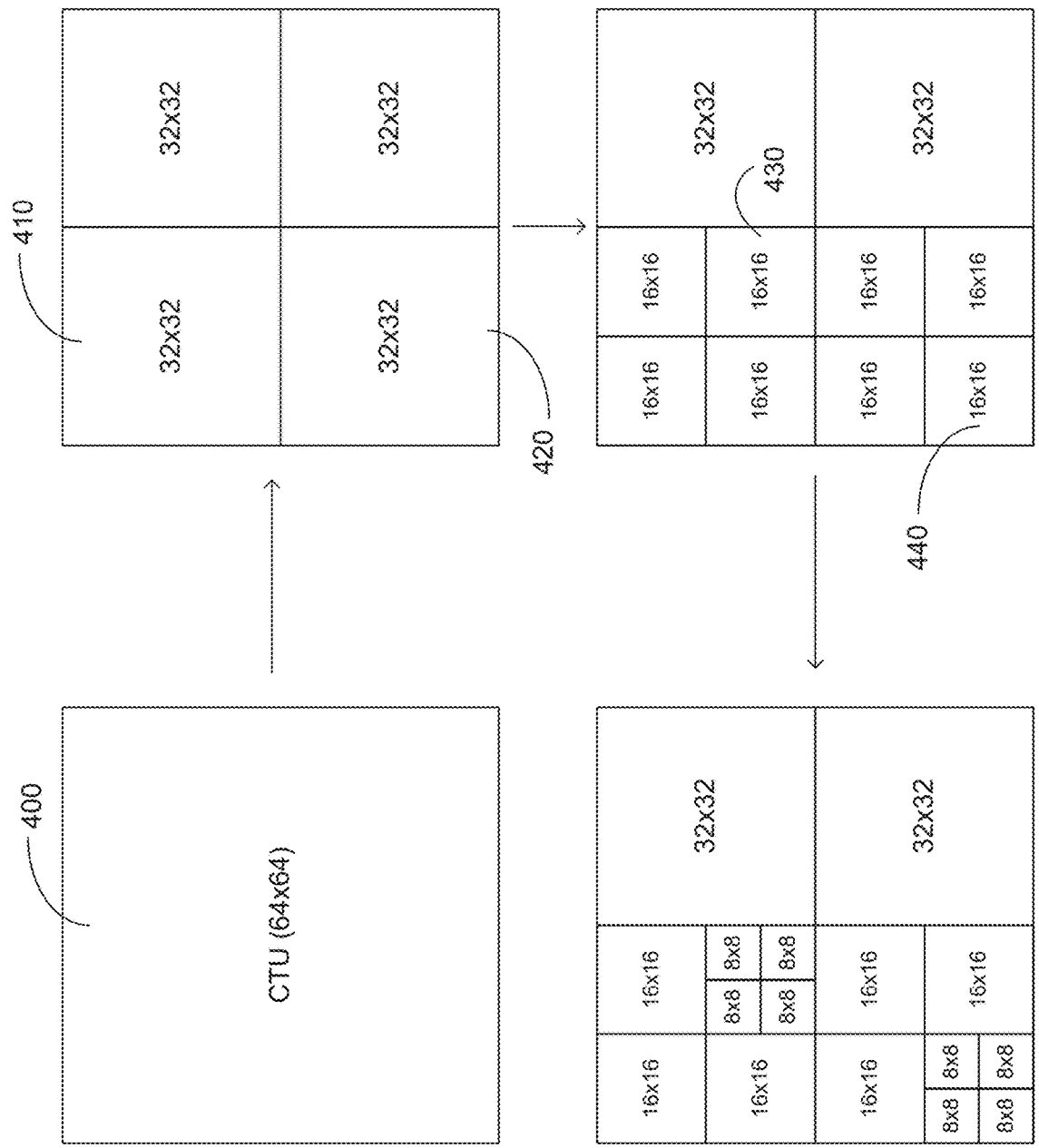
Figure 4D:
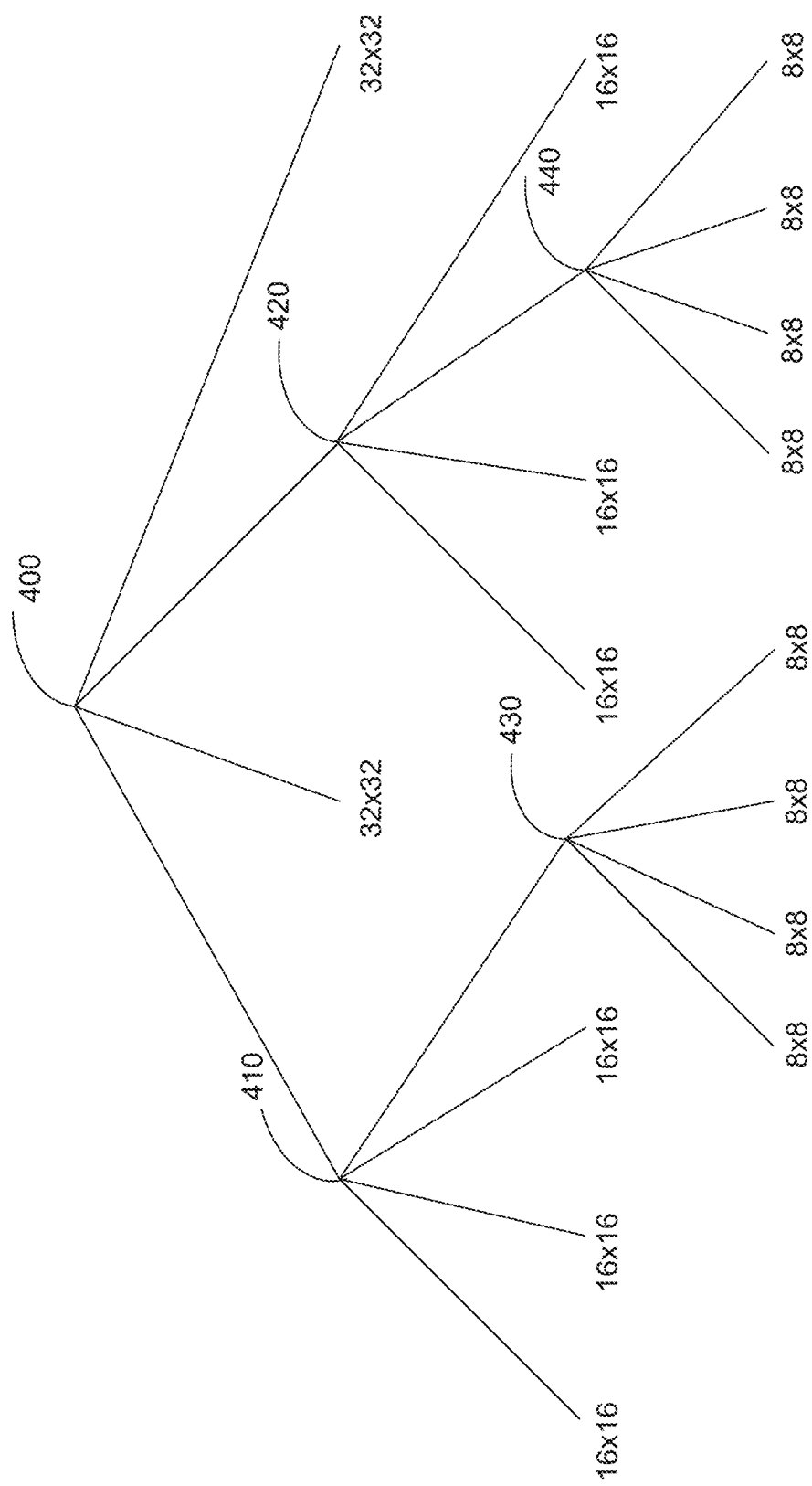
Figure 4E:
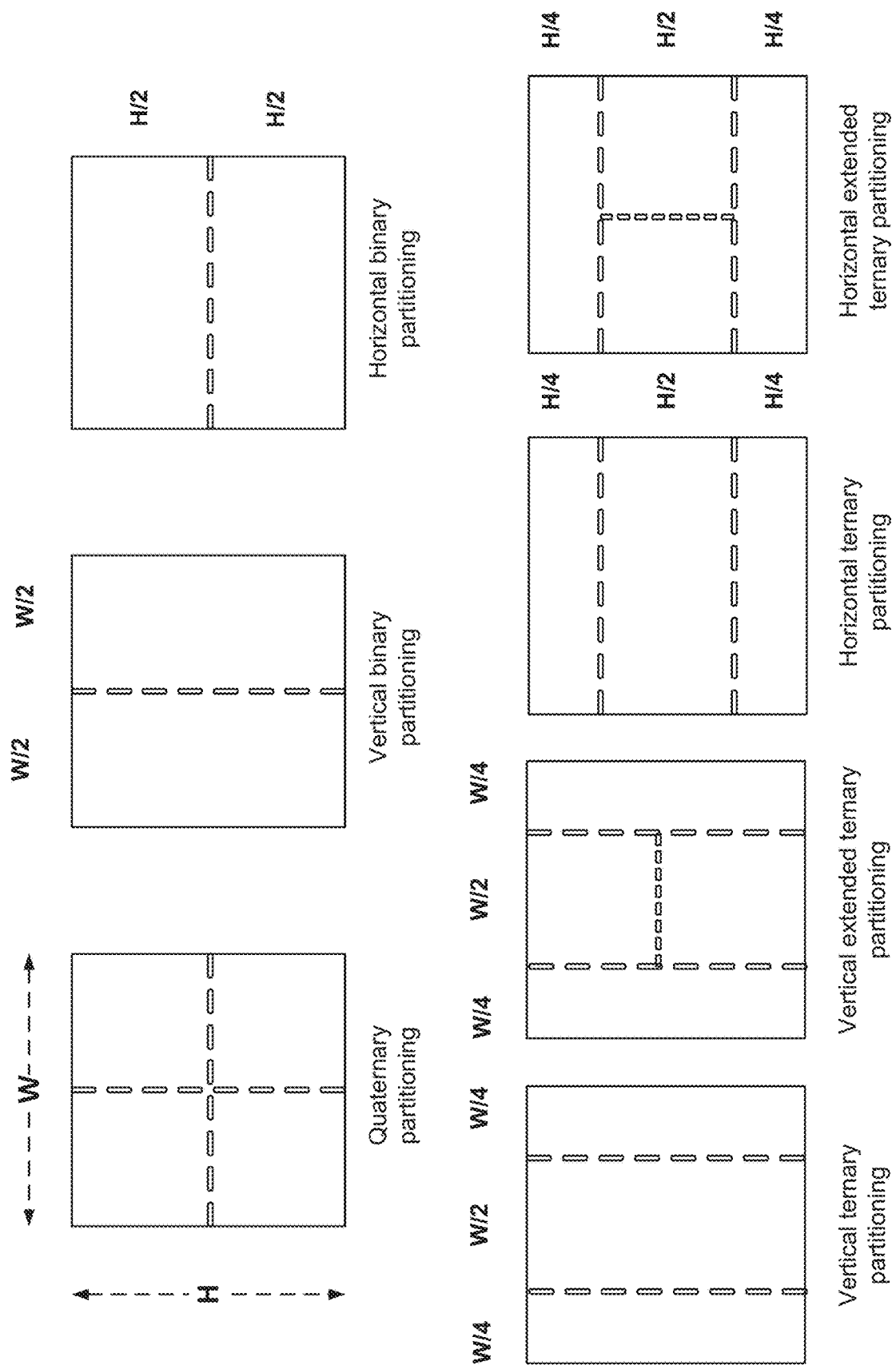

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

A brief description for CTU partitioning in ECM is provided herein. In HEVC, a CTU can be split into CUs by using a quaternary-tree structure (denoted as a coding tree) to adapt to various local characteristics. A decision whether to code a picture area using inter-picture (temporal) or intra-picture (spatial) prediction can be made at the leaf CU level. Each leaf CU can be further split into one, two, or four PUs according to a PU splitting type. Within each PU, the same prediction process can be applied, and the relevant information can be transmitted to the video decoder 30 on a PU basis. After obtaining a residual block by applying the prediction process based on the PU splitting type, the leaf CU can be partitioned into transform units (TUs) according to another quaternary-tree structure similar to the coding tree for the CU. A feature of the HEVC structure includes that it has multiple partition unit concepts such as CU, PU, and TU.

In VVC, a quadtree with a nested multi-type tree using a binary-split or ternary-split structure replaces the concepts of the multiple partition unit types (e.g., CU, PU, TU) in HEVC. For example, in VCC the separation of the CU, PU, and TU concepts is removed except as needed for CUs that have a size too large for the maximum transform length, thereby supporting a higher flexibility for CU partition shapes. In the coding tree structure, a CU can have either a square or rectangular shape. A CTU is first partitioned by a quaternary tree (a.k.a. quadtree) structure. Then, the quaternary tree leaf nodes can be further partitioned by a multi-type tree structure. As shown in FIG. 4E, there are various splitting types in the multi-type tree structure, including vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are referred to as CUs. Unless a CU is too large for the maximum transform length, this segmentation with the multi-type tree structure is used for prediction and transform processing without any further partitioning. This means that, in most cases, the CU, PU, and TU have the same block size in the quadtree with the nested multi-type tree coding block structure. An exception occurs when the supported maximum transform length is smaller than a width or height of the color component of the CU.

Figure 5:
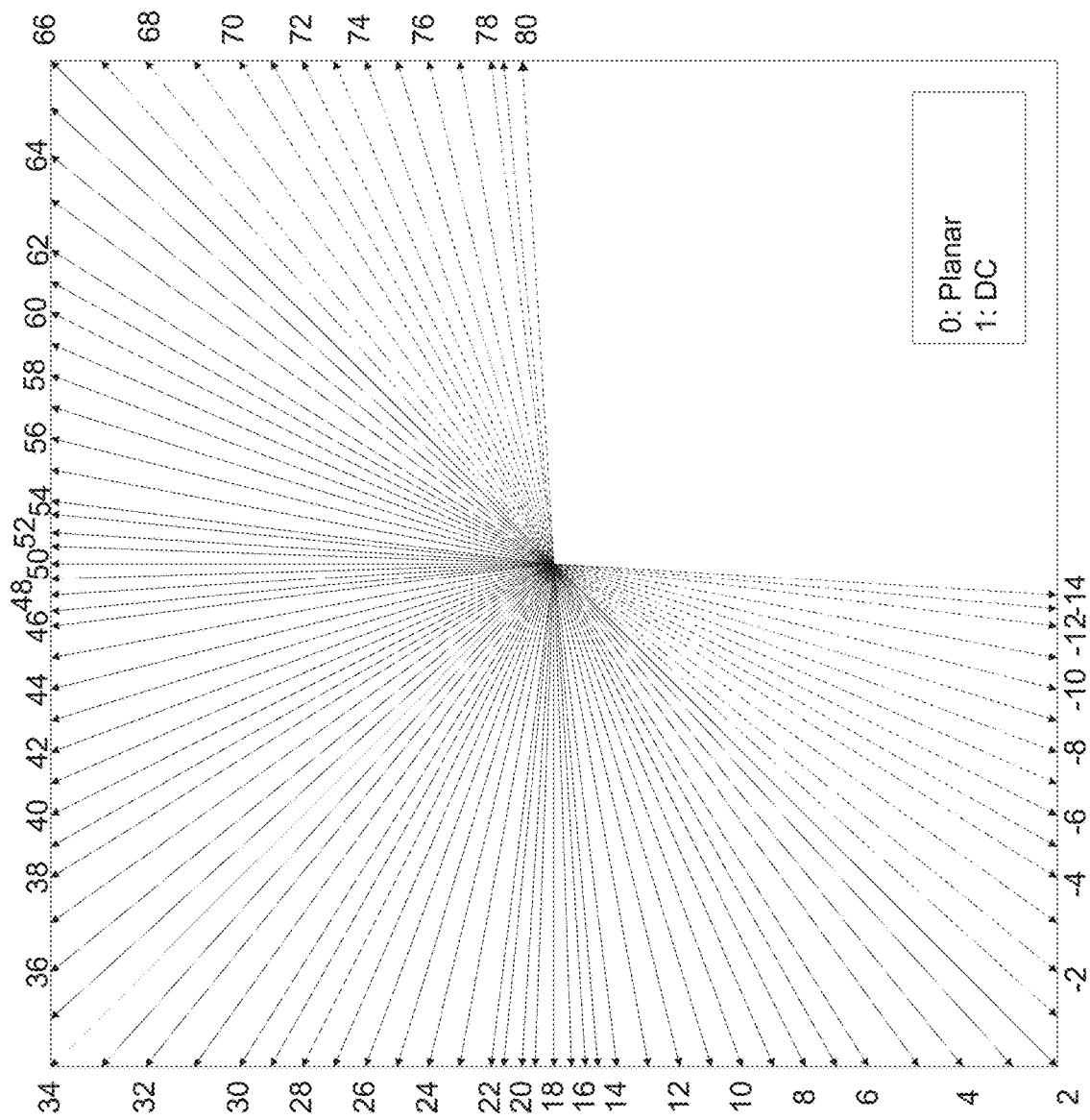
FIG. 5 illustrates a diagram of intra modes as used in VVC in accordance with some implementations of the present disclosure.

FIG. 5 illustrates a diagram of intra modes as used in VVC in accordance with some examples. In general, a basic intra prediction scheme applied in VVC is almost the same as that of HEVC, except that several prediction tools are further extended, added and/or improved, e.g., extended intra prediction with wide-angle intra modes, Multiple Reference Line (MRL) intra prediction, Position-Dependent intra Prediction Combination (PDPC), ISP prediction, Cross-Component Linear Model (CCLM) prediction, and Matrix weighted Intra Prediction (MIP).

A brief description for extended intra prediction with wide-angle intra modes is provided herein. Like HEVC, VVC uses a set of reference samples neighboring a current CU (e.g., samples above the current CU and left to the current CU) to predict samples of the current CU. However, to capture finer edge directions present in natural video (especially for video content in high resolutions, e.g., 4K), the number of angular intra modes is extended from 33 in HEVC to 93 in VVC. As shown in FIG. 5, among the 93 angular intra modes, modes 2 to 66 are conventional angular intra modes, and modes −1 to −14 and modes 67 to 80 are wide-angle intra modes. In addition to the angular intra modes, the planar mode (mode 0 in FIG. 5) and Direct Current (DC) mode (mode 1 in FIG. 5) of HEVC are also applied in VVC.

Since a quad/binary/ternary tree partition structure is applied in VVC, besides video blocks in a square shape, rectangular video blocks also exist for the intra prediction in VVC. Due to unequal width and height of one given video block, various sets of angular intra modes may be selected from the 93 angular intra modes for different block shapes. More specifically, for both square and rectangular video blocks, besides planar and DC modes, 65 angular intra modes among the 93 angular intra modes are also supported for each block shape. When a rectangular block shape of a video block satisfies a certain condition, an index of a wide-angle intra mode of the video block may be adaptively determined by video decoder 30 according to an index of a conventional angular intra mode received from video encoder 20 using a mapping relationship as shown in Table 1 below. That is, for non-square blocks, the wide-angle intra modes are signaled by video encoder 20 using the indexes of the conventional angular intra modes, which are mapped to indexes of the wide-angle intra modes by video decoder 30 after being parsed, thus ensuring that a total number (i.e., 67) of intra modes (i.e., the planar mode, the DC mode and 65 angular intra modes among the 93 angular intra modes) is unchanged, and the intra mode coding method is unchanged. As a result, a good efficiency of signaling intra modes is achieved while providing a consistent design across different block sizes.

The following Table 1 shows a mapping relationship between indexes of conventional angular intra modes and indexes of wide-angle intra modes for the intra prediction of different block shapes in VCC, wherein W represents a width of a video block, and H represents a height of the video block.

TABLE 1

| Block shape | Aspect ratio | Indexes of conventional angular intra modes | Indexes of wide-angle intra modes |
|---|---|---|---|
| Square, W = H | W/H == 1 | None | None |
| Flat rectangle, W > H | W/H == 2 | 2, 3, 4, 5, 6, 7, 8, 9 | 67, 68, 69, 70, 71, 72, 73, 74 |
| | W/H == 4 | 2, 3, 4, 5, 6, 7, 8, 9, 10, 11 | 67, 68, 69, 70, 71, 72, 73, 74, 75, 76 |
| | W/H == 8 | 2, 3, 4, 5, 6, 7, 8, 9, 10, 11, 12, 13 | 67, 68, 69, 70, 71, 72, 73, 74, 75, 76, 77, 78 |
| | W/H == 16 | 2, 3, 4, 5, 6, 7, 8, 9, 10, 11, 12, 13, 14, 15 | 67, 68, 69, 70, 71, 72, 73, 74, 75, 76, 77, 78, 79, 80 |
| Tall rectangle, W < H | W/H == ½ | 59, 60, 61, 62, 63, 64, 65, 66 | −8, −7, −6, −5, −4, −3, −2, −1 |
| | W/H == ¼ | 57, 58, 59, 60, 61, 62, 63, 64, 65, 66 | −10, −9, −8, −7, −6, −5, −4, −3, −2, −1 |
| | W/H == ⅛ | 55, 56, 57, 58, 59, 60, 61, 62, 63, 64, 65, 66 | −12, −11, −10, −9, −8, −7, −6, −5, −4, −3, −2, −1 |
| | W/H == 1/16 | 53, 54, 55, 56, 57, 58, 59, 60, 61, 62, 63, 64, 65, 66 | −14, −13, −12, −11, −10, −9, −8, −7, −6, −5, −4, −3, −2, −1 |

Figure 6:
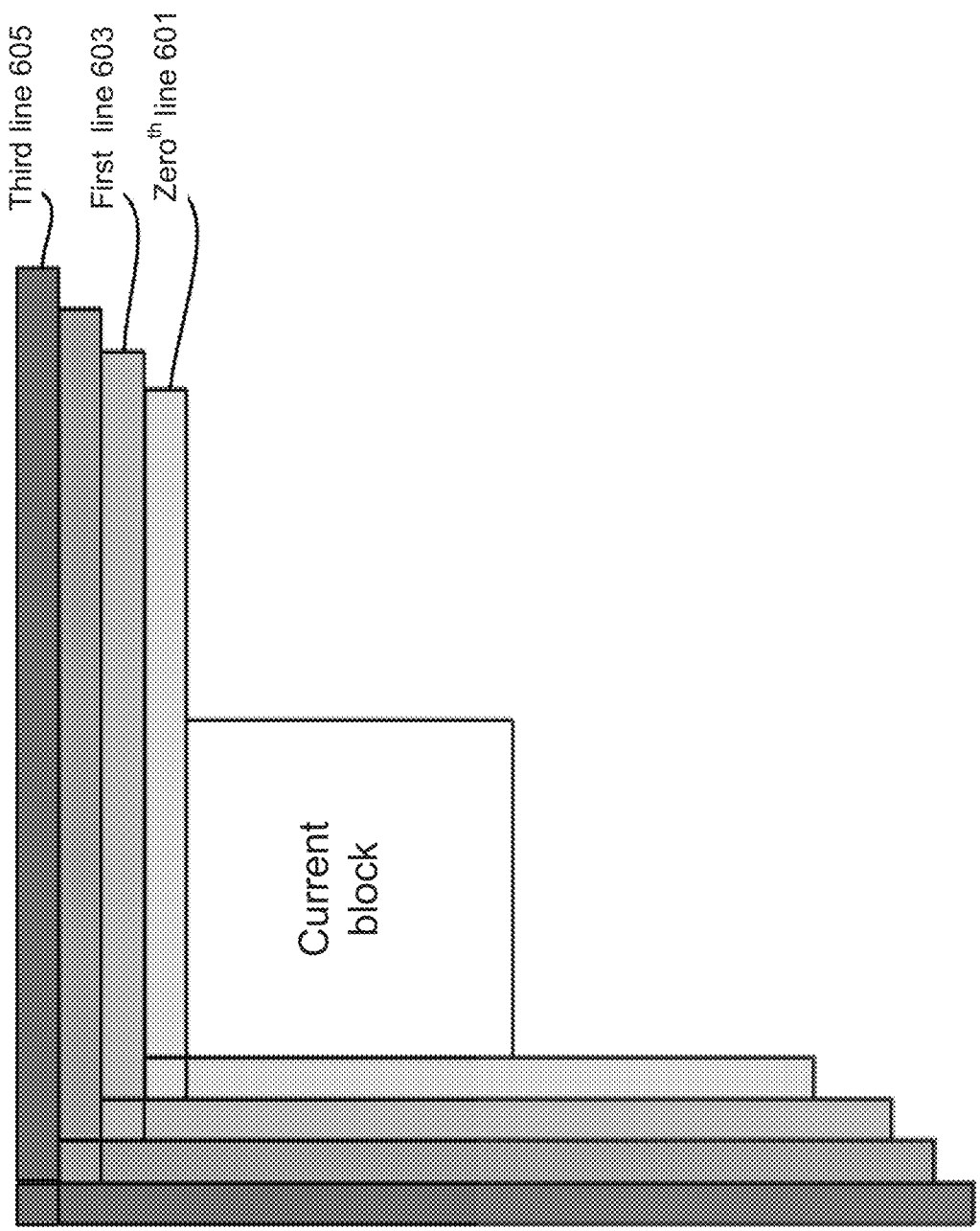
FIG. 6 illustrates a diagram of multiple reference lines for intra prediction in accordance with some implementations of the present disclosure.

FIG. 6 illustrates a diagram of MRLs for intra prediction in accordance with some examples. Like the intra prediction in HEVC, all the intra modes (i.e., planar, DC and angular intra modes) in VVC utilize a set of reference samples above and left to a current video block for intra prediction. However, differently from HEVC where only the nearest row/column (i.e., a zero$^{th}$ line 601 in FIG. 6) of reference samples are used, MRL intra prediction is introduced in VVC where in addition to the nearest row/column of reference samples, two additional rows/columns of reference samples (i.e., a first line 603 and a third line 605 in FIG. 6) may be used for the intra prediction. An index of a selected row/column of reference samples is signaled from video encoder 20 to video decoder 30. When a non-nearest row/column of reference samples (i.e., the first line 603 or the third line 605 in FIG. 6) is selected, the planar mode is excluded from a set of intra modes that may be used to predict the current video block. The MRL intra prediction is disabled for a first row/column of video blocks inside a current CTU to prevent using extended reference samples outside the current CTU.

Figure 7A:
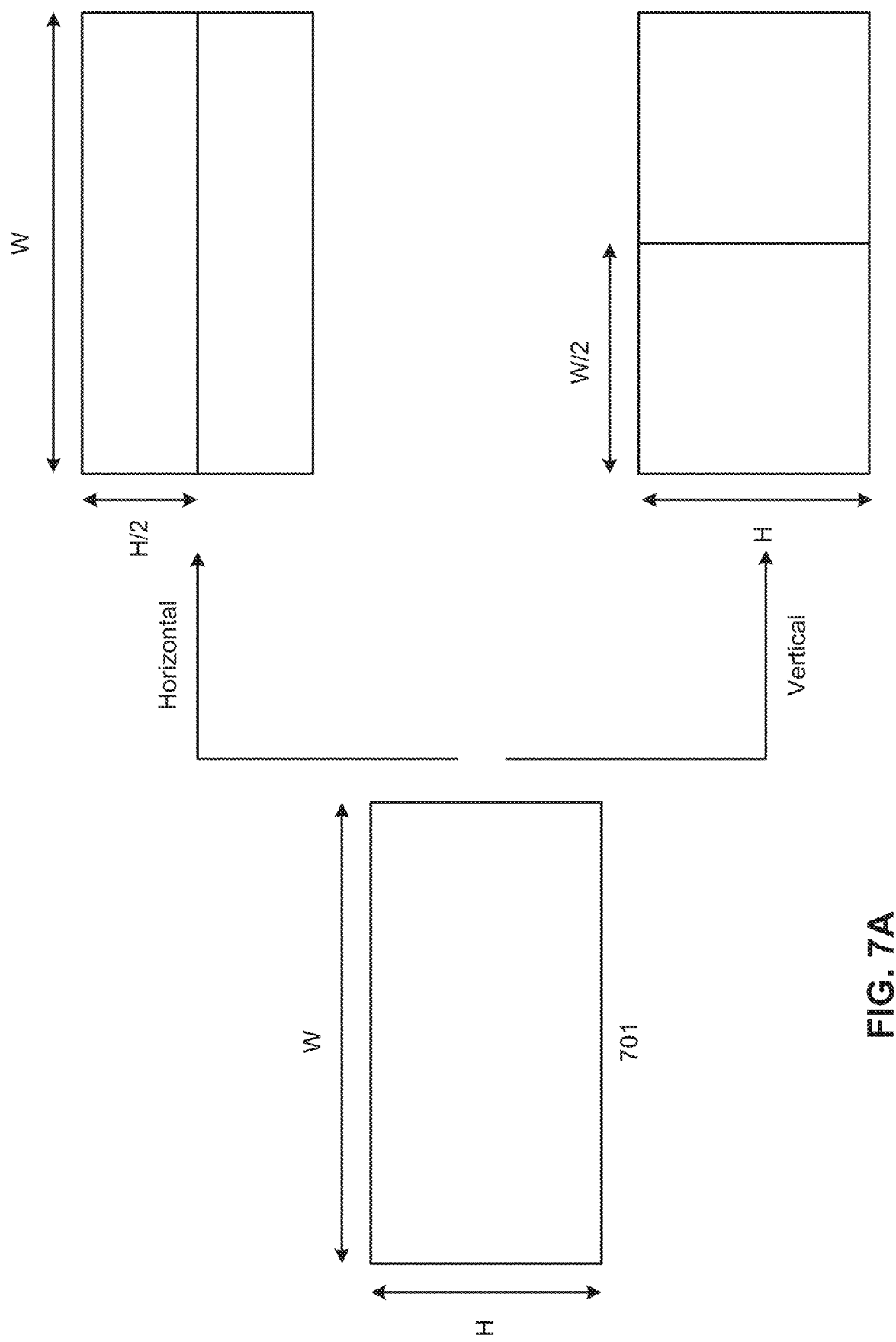
FIG. 7A illustrates a diagram of sub-partitions for 4×8 and 8×4 coding units (CUs) in accordance with some implementations of the present disclosure.
Figure 7B:
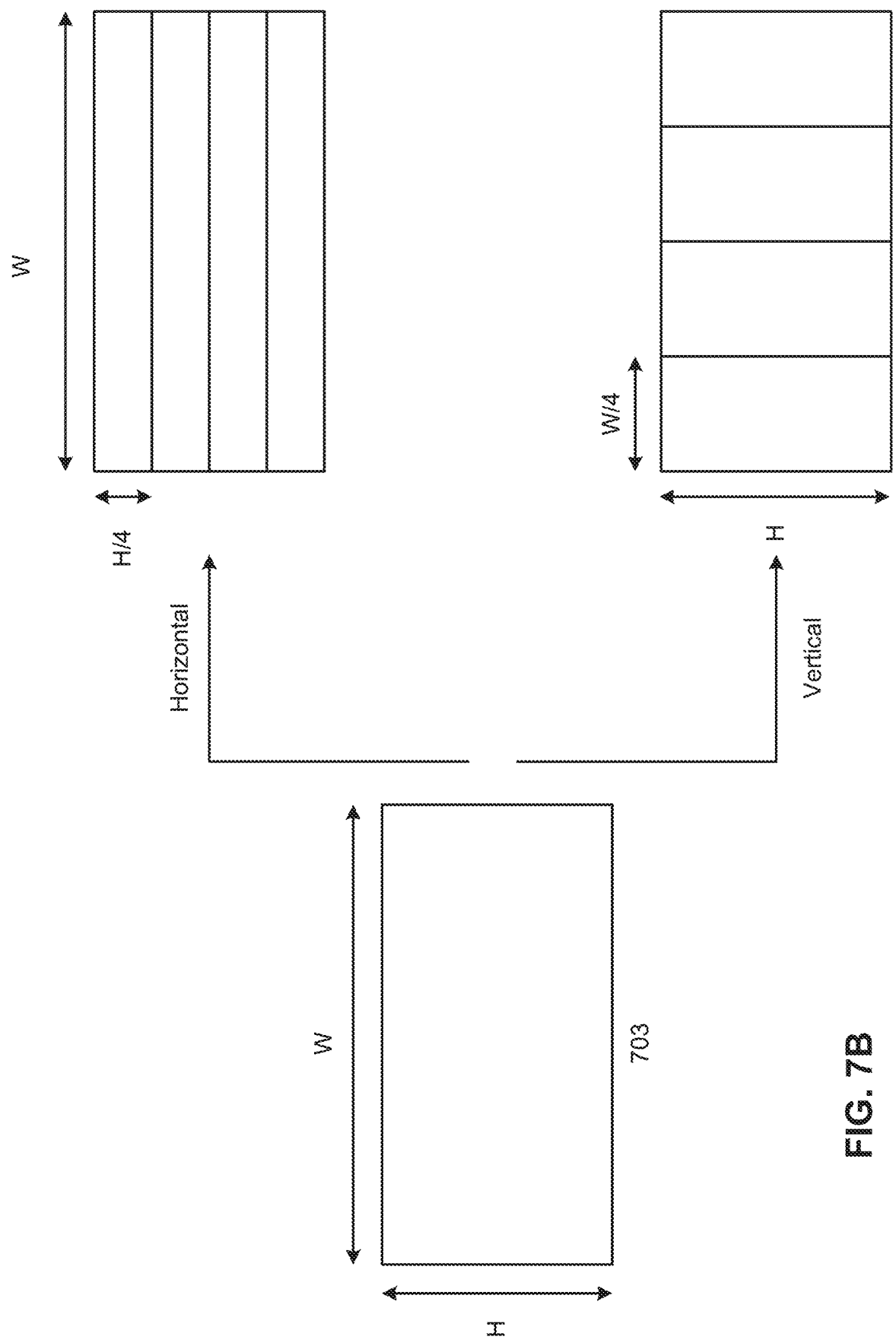
FIG. 7B illustrates a diagram of sub-partitions for CUs other than 4×8, 8×4, and 4×4 CUs in accordance with some implementations of the present disclosure.

FIG. 7A illustrates a diagram of sub-partitions for 4×8 and 8×4 CUs in an ISP mode in accordance with some examples. FIG. 7B illustrates a diagram of sub-partitions for CUs other than 4×8, 8×4, and 4×4 CUs in the ISP mode in accordance with some examples. The ISP prediction is a tool applied for luma intra prediction modes, which divides luma video blocks vertically or horizontally into 2 or 4 sub-partitions depending on block sizes thereof, as shown in the following Table 2. For example, a minimum block size for ISP is 4×8 or 8×4. If a size of a video block is greater than 4×8 (or 8×4), then the video block is divided into 4 sub-partitions.

TABLE 2

| Block size | Number of sub-partitions |
|---|---|
| 4 × 4 | Not divided |
| 4 × 8 and 8 × 4 | 2 |
| All other feasible cases | 4 |

It is noted that M×128 (with M≤64, M referring to the block width) and 128×N (with N≤64, N referring to the block height) ISP blocks may generate a potential issue with a 64×64 Video and Data Processing Unit (VDPU). For example, an M×128 CU in the single tree case has an M×128 luma TB and two corresponding $\frac{M}{2} \times 64$ chroma TBs. If the CU uses ISP, then the luma TB can be divided into four M×32 TBs (only the horizontal split is possible), with each TB being smaller than 64×64. However, in the current design of ISP, chroma blocks are not divided. Therefore, both chroma components have a size greater than 32×32. Analogously, a similar situation can be incurred with a 128×N CU using ISP. These situations can be issues for a 64×64 decoder pipeline. Therefore, the CU size that can use ISP is restricted to a maximum of 64×64.

FIGS. 7A and 7B show diagrams of sub-partitions depending on a block size. If a block size W×H of a video block (for example, the video block 701 as shown in FIG. 7A) is equal to 4×8 or 8×4, then the video block is divided into 2 sub-partitions. If a block size W×H of a video block (for example, the video block 703 as shown in FIG. 7B) is greater than 4×8 or 8×4, then the video block is divided into 4 sub-partitions. A CU size that may use ISP is restricted to a maximum of 64×64. All sub-partitions fulfill a condition of having at least 16 samples.

In ISP, the dependence of 1×N/2×N sub-block prediction on the reconstructed values of previously decoded 1×N/2×N sub-blocks of the coding block is not allowed such that the minimum width of prediction for sub-blocks becomes four samples. For example, an 8×N (N>4) coding block that is coded using ISP with vertical split is split into two prediction regions each with a size of 4×N and four transforms with a size of 2×N. Also, a 4×N coding block that is coded using ISP with vertical split is predicted using the full 4×N block, and four transforms each with a size of 1×N is used. Although the transform sizes of 1×N and 2×N are allowed, it is asserted that the transform of these blocks in 4×N regions can be performed in parallel. For example, when a 4×N prediction region includes four 1×N transforms, there is no transform in the horizontal direction; and the transform in the vertical direction can be performed as a single 4×N transform in the vertical direction. Similarly, when a 4×N prediction region includes two 2×N transform blocks, the transform operation of the two 2×N blocks in each direction (horizontal and vertical) can be conducted in parallel. Thus, there is no delay added in processing of these smaller blocks than processing 4×4 regular-coded intra blocks.

For each sub-partition, reconstructed samples are obtained by adding a residual signal to a prediction signal. Here, the residual signal is generated by processes such as entropy decoding, inverse quantization, and inverse transform. The reconstructed samples of each sub-partition are available to generate prediction of a next sub-partition. In addition, a first sub-partition to be processed is the one containing a top-left sample of the CU, and after the first sub-partition is processed, the ISP prediction continues downwards (for horizontal splitting as shown in FIGS. 7A and 7B) or rightwards (for vertical splitting as shown in FIGS. 7A and 7B). All sub-partitions share the same intra prediction mode.

A summary of interaction between ISP and other coding tools is provided herein. With respect to MRL, if a block has an MRL index other than 0, then the ISP coding mode may be inferred to be 0. Therefore, the ISP mode information may not be sent to the video decoder 30.

With respect to an entropy coding coefficient group size, the sizes of the entropy coding sub-blocks are modified so that they have 16 samples in all possible cases, as shown in the following Table 3. It is noted that the new sizes only affect blocks produced by ISP in which one of the dimensions is less than 4 samples. In all other cases, the coefficient groups keep the 4×4 dimensions.

TABLE 3

| Block Size | Coefficient group Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

With respect to Coded Block Flag (CBF) coding, it is assumed that at least one of the sub-partitions has a non-zero CBF. Hence, if n is the number of sub-partitions and the first n−1 sub-partitions have produced a zero CBF, then the CBF of the n-th sub-partition is inferred to be 1. With respect to the transform size restriction, all ISP transforms with a length larger than 16 points uses the DCT-II.

With respect to a Multi Transform Selection (MTS) flag, if a CU uses the ISP coding mode, the MTS CU flag can be set to 0 and it may not be sent to the video decoder 30. Therefore, the video encoder 20 may not perform RD tests for the different available transforms for each resulting sub-partition. The transform choice for the ISP mode may instead be fixed and selected according to the intra mode, the processing order, and the block size utilized. Hence, no signaling is required. For example, let $t_H$ and $t_V$ be the horizontal and the vertical transforms selected respectively for the w×h sub-partition, where w is the width and h is the height. Then the transform is selected according to the following rules: (a) if w=1 or h=1, then there is no horizontal or vertical transform respectively; (b) if w≥4 and w≤16, then $t_H$=DST-VII, otherwise, $t_H$=DCT-II; (c) if h≥4 and h≤16, then $t_V$=DST-VII, otherwise, $t_V$=DCT-II.

In the ISP mode, all 67 intra modes are allowed. Position-Dependent intra Prediction Combination (PDPC) is also applied if the corresponding width or height has at least 4 samples. In addition, the reference sample filtering process (reference smoothing) and the condition for intra interpolation filter selection doesn't exist anymore, and Cubic (DCT-IF) filter is applied for fractional position interpolation in the ISP mode.

In the ECM, flexible block partition which incorporate quaternary, binary, or ternary trees is adopted to capture the characteristics of video contents. For example, a CU can be divided into four sub-CUs using a quaternary partition. The sub-CUs are processed only in a fixed CU scan order, i.e., a raster scan order, along the top-left to bottom-right direction. In the intra prediction, reference samples of the CU are located in the top and left neighboring positions, which may lead to low prediction accuracy when the spatial correlation of the sub-CUs is not along the top-left to bottom-right direction.

Besides, the ISP mode is adopted in VVC and ECM. In the ISP mode, a CU is divided into several sub-partitions (e.g., TUs) vertically or horizontally. In existing designs of the ISP, these sub-partitions are processed only in a fixed sub-partition order, e.g., from the top sub-partitions to the bottom sub-partitions for the horizontal partition (or, from the left sub-partitions to the right sub-partitions for the vertical partition). Like the fixed CU scan order, the fixed sub-partition order may also result in prediction with low accuracy when the actual spatial correlation of the sub-partitions is not along the top to bottom direction (or the left to right direction).

That is, the fixed CU scan order or the fixed sub-partition scan order in the existing designs may result in intra prediction with low accuracy, which makes the coding efficiency ineffective. To address one or more of the above-mentioned issues caused by the fixed CU scan order or the fixed sub-partition scan order, a video processing method and apparatus for intra prediction with an adaptive coding order are disclosed in the present disclosure to improve the coding efficiency of intra prediction. For example, an adaptive coding order (e.g., an adaptive CU order or an adaptive sub-partition order) can be introduced into the ECM/VVC as disclosed herein.

Consistent with some implementations of the present disclosure, a video block (e.g., a CU) can be divided into four video sub-blocks (e.g., four sub-CUs) based on a quadtree partition. An adaptive coding order can be applied for the coding of the four video sub-blocks to improve the prediction accuracy. Consistent with some other implementations of the present disclosure, the quadtree-based adaptive coding order can also be adapted to binary or ternary partitions. For example, an adaptive coding order can also be applied for the coding of video sub-blocks derived from the binary or ternary partition. When the video block is a CU, an adaptive coding order with respect to the quadtree-based, binary-tree-based, or ternary-tree-based partition can also be referred to as an adaptive CU order herein.

Consistent with yet some other implementations of the present disclosure, ISP can be adopted to further divide the video block into a plurality of sub-partitions, and an adaptive coding order can also be applied to the coding of the plurality of sub-partitions to improve the prediction accuracy of the sub-partitions. In this case, the adaptive coding order can also be referred to as an adaptive sub-partition order herein.

Figure 8:
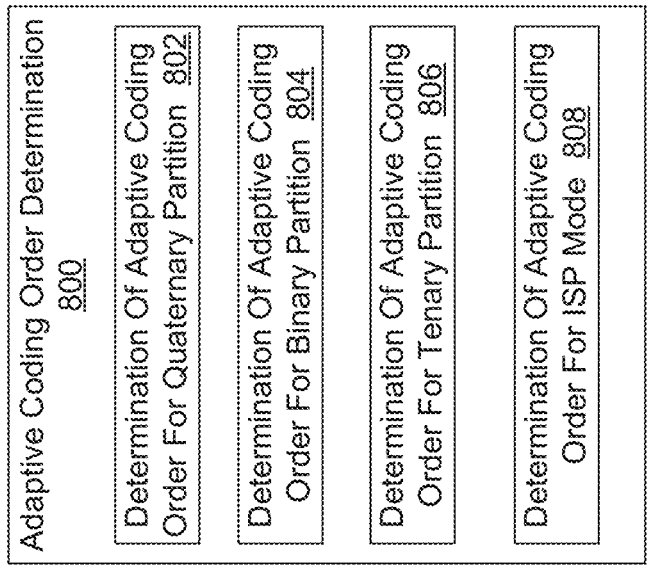
FIG. 8 is a block diagram illustrating exemplary adaptive coding order determination in accordance with some implementations of the present disclosure.
Figure 15:
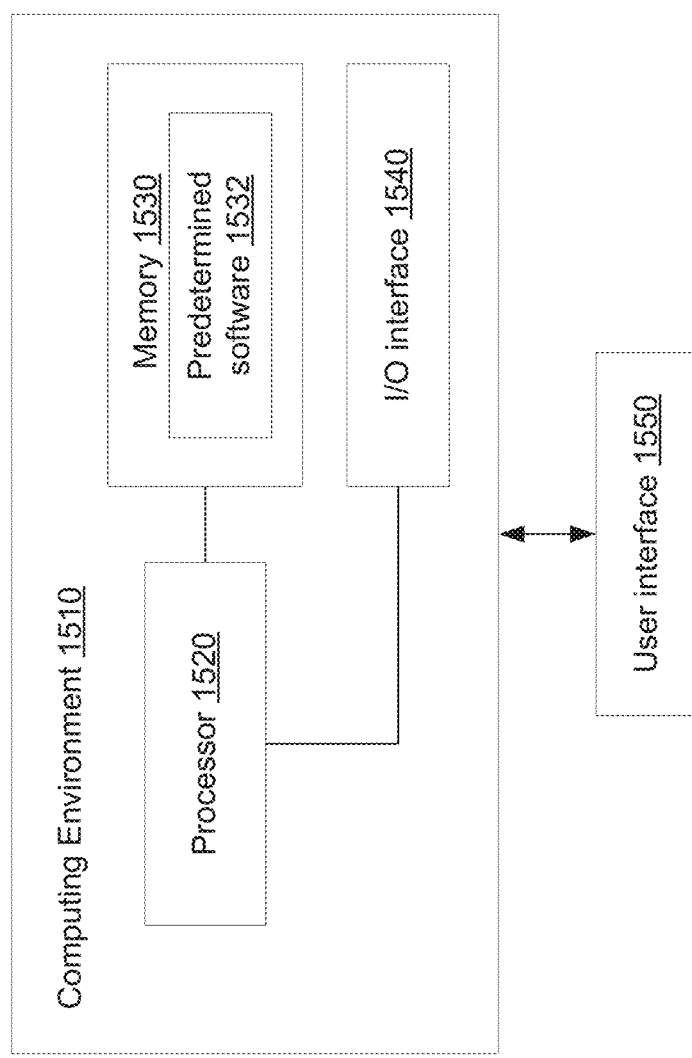
FIG. 15 is a block diagram illustrating a computing environment coupled with a user interface in accordance with some implementations of the present disclosure.

FIG. 8 is a block diagram illustrating an exemplary adaptive coding order determination process 800 in accordance with some implementations of the present disclosure. In some implementations, adaptive coding order determination process 800 can be performed by prediction processing unit 41 of video encoder 20, or prediction processing unit 81 of video decoder 30. In some implementations, adaptive coding order determination process 800 may be performed by a processor (e.g., a processor 1520 as shown in FIG. 15) at an encoder side or a decoder side. For illustration purpose only, the following description of FIG. 8 is provided with respect to the processor. In some implementations, adaptive coding order determination process 800 may include a determination 802 of an adaptive coding order for a quaternary partition, a determination 804 of an adaptive coding order for a binary partition, a determination 806 of an adaptive coding order for a ternary partition, or a determination 808 of an adaptive coding order for the ISP mode. FIG. 8 is described below together with FIGS. 9-12B.

Before describing determinations 802, 804, 806, and 808 in details, an overall process for performing intra prediction with an adaptive coding order on a video block from a video frame of a video is disclosed herein. Initially, the processor may receive one or more reference blocks from the video frame. The one or more reference blocks may include one or more neighboring blocks located on a left neighboring region of the video block, one or more neighboring blocks located on a top neighboring region of the video block, or both. For example, the one or more reference blocks may include at least one of the $0^{th}$ reference line 601, the $1^{st}$ reference line 603, or the 3rd reference line 605 as illustrated in FIG. 6.

Next, the processor may divide the video block into a plurality of video sub-blocks. For example, the video block can be split into video sub-blocks using a binary, ternary, or quaternary partition to generate two, three, or four video sub-blocks, respectively. In another example, the ISP mode can be applied to split the video block into a plurality of sub-partitions (e.g., two or four sub-partitions), where the plurality of sub-partitions share a common intra prediction mode with respective transform types.

Figure 9:
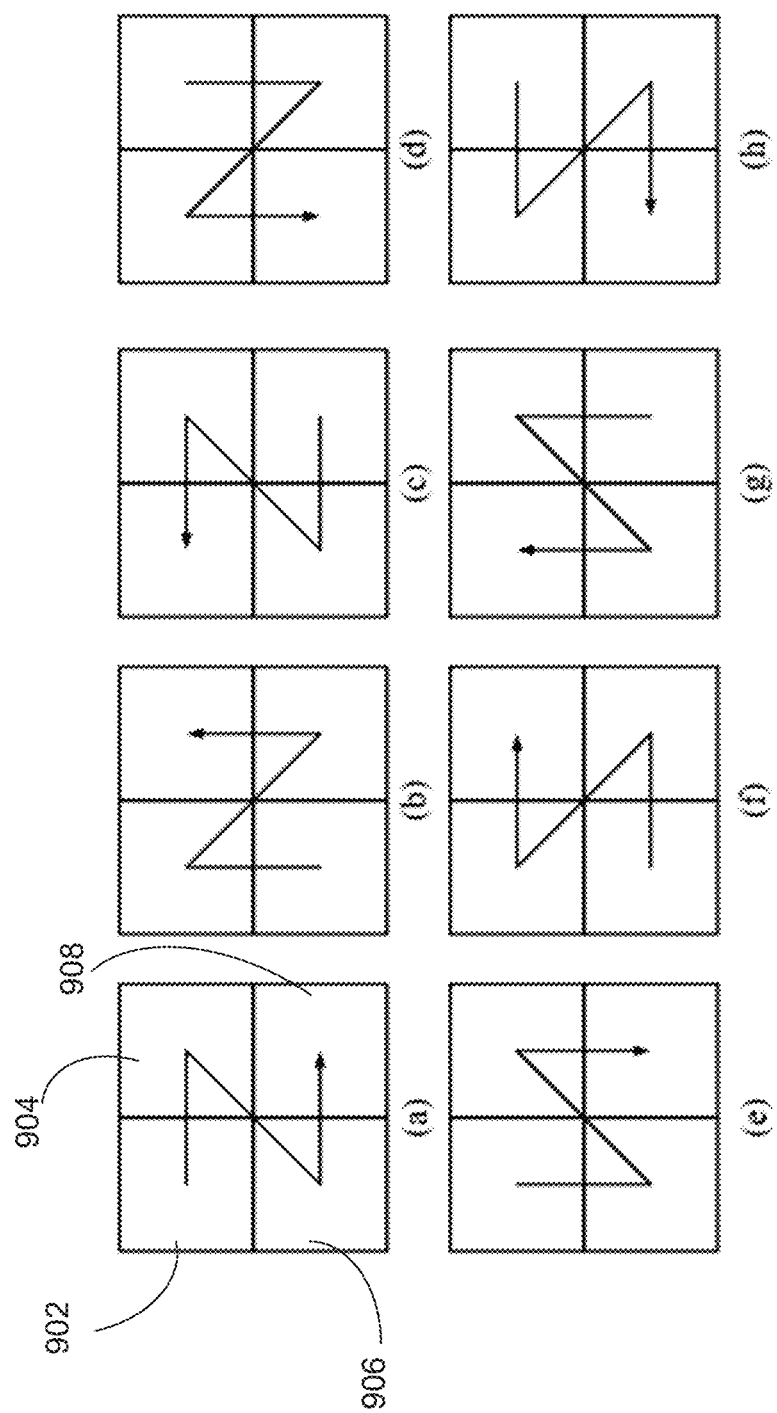
FIG. 9 is an illustration of exemplary coding orders when a quaternary partition is performed on a video block in accordance with some implementations of the present disclosure.
Figure 10A:
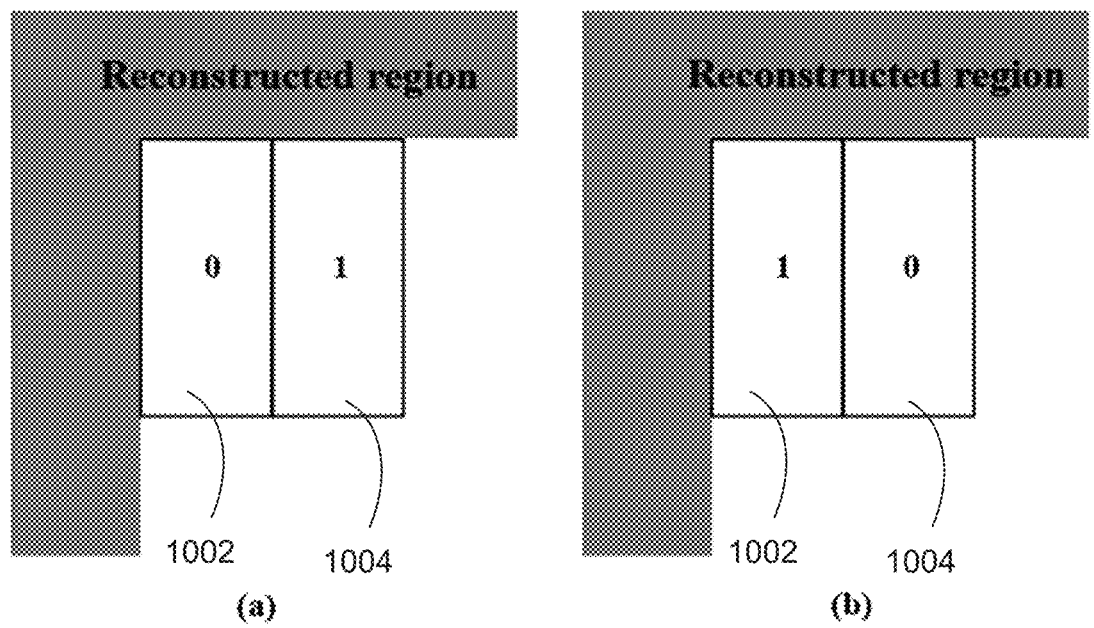
FIG. 10A is an illustration of exemplary coding orders when a vertical binary partition is performed on a video block in accordance with some implementations of the present disclosure.
Figure 10B:
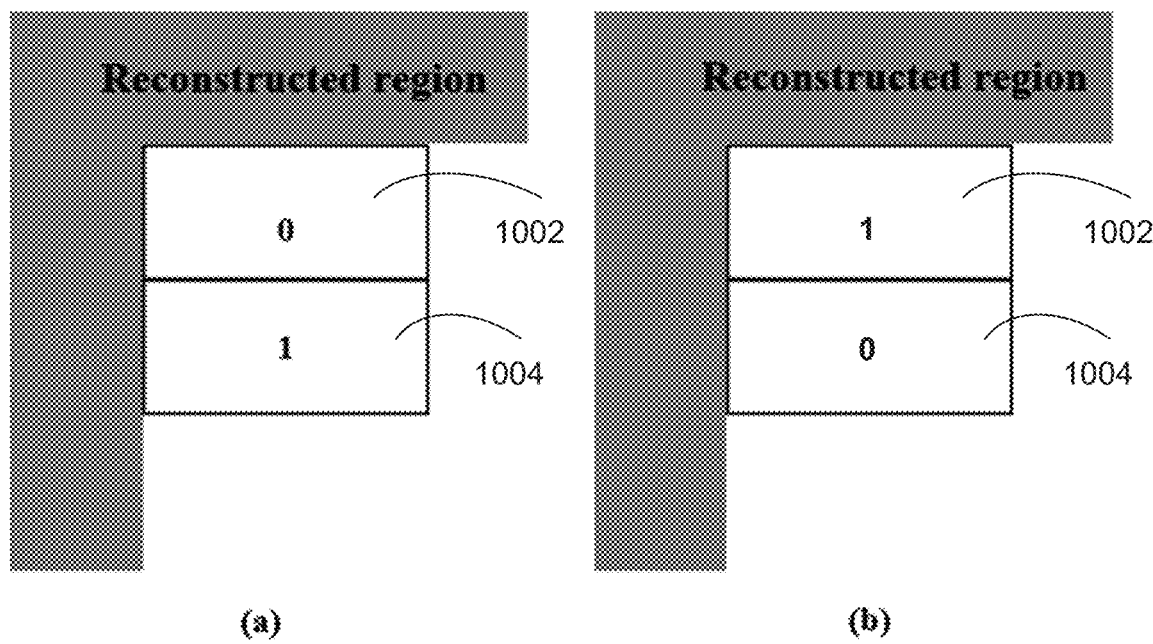
FIG. 10B is an illustration of exemplary coding orders when a horizontal binary partition is performed on a video block in accordance with some implementations of the present disclosure.
Figure 11A:
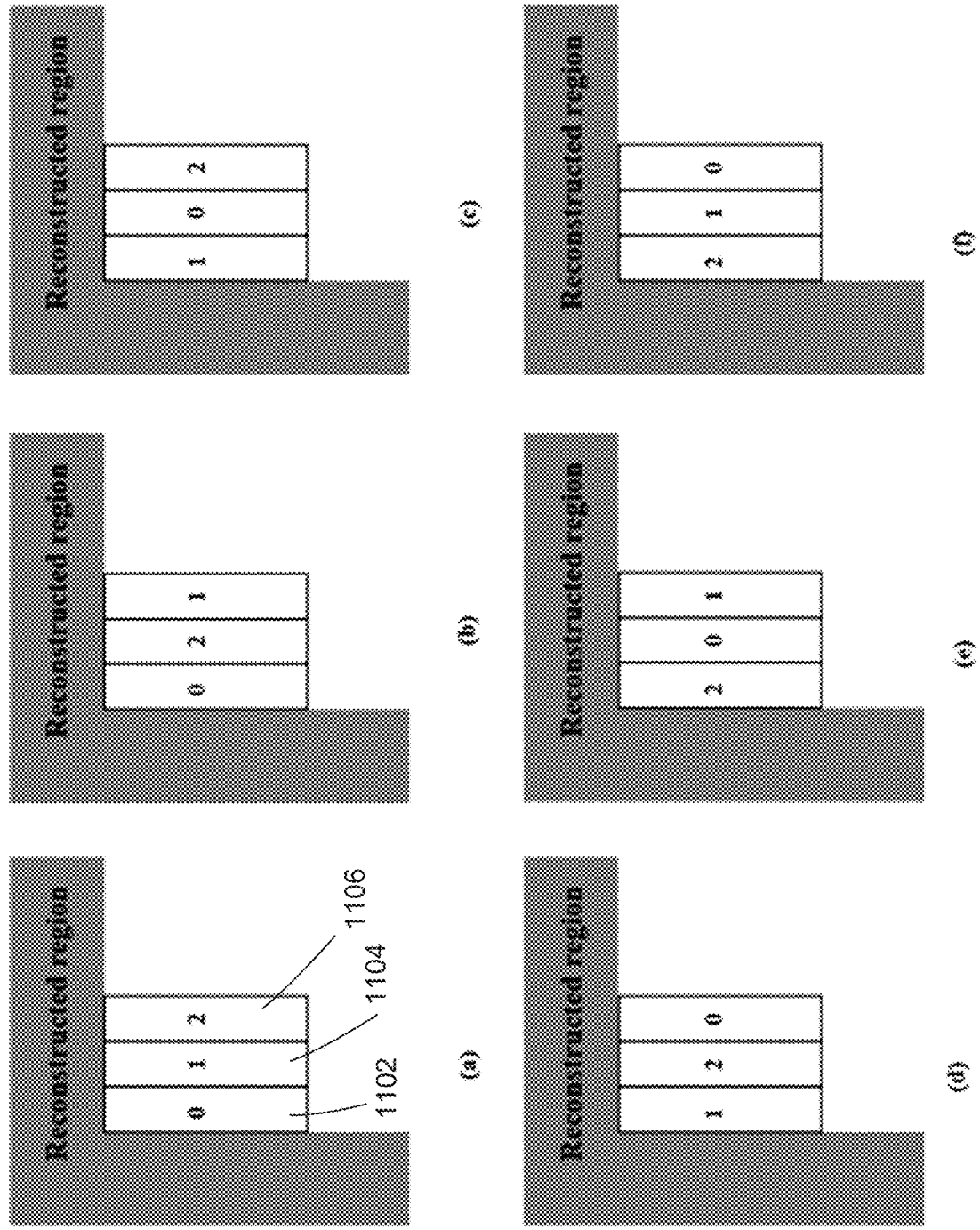
FIG. 11A is an illustration of exemplary coding orders when a vertical ternary partition is performed a video block in accordance with some implementations of the present disclosure.
Figure 11B:
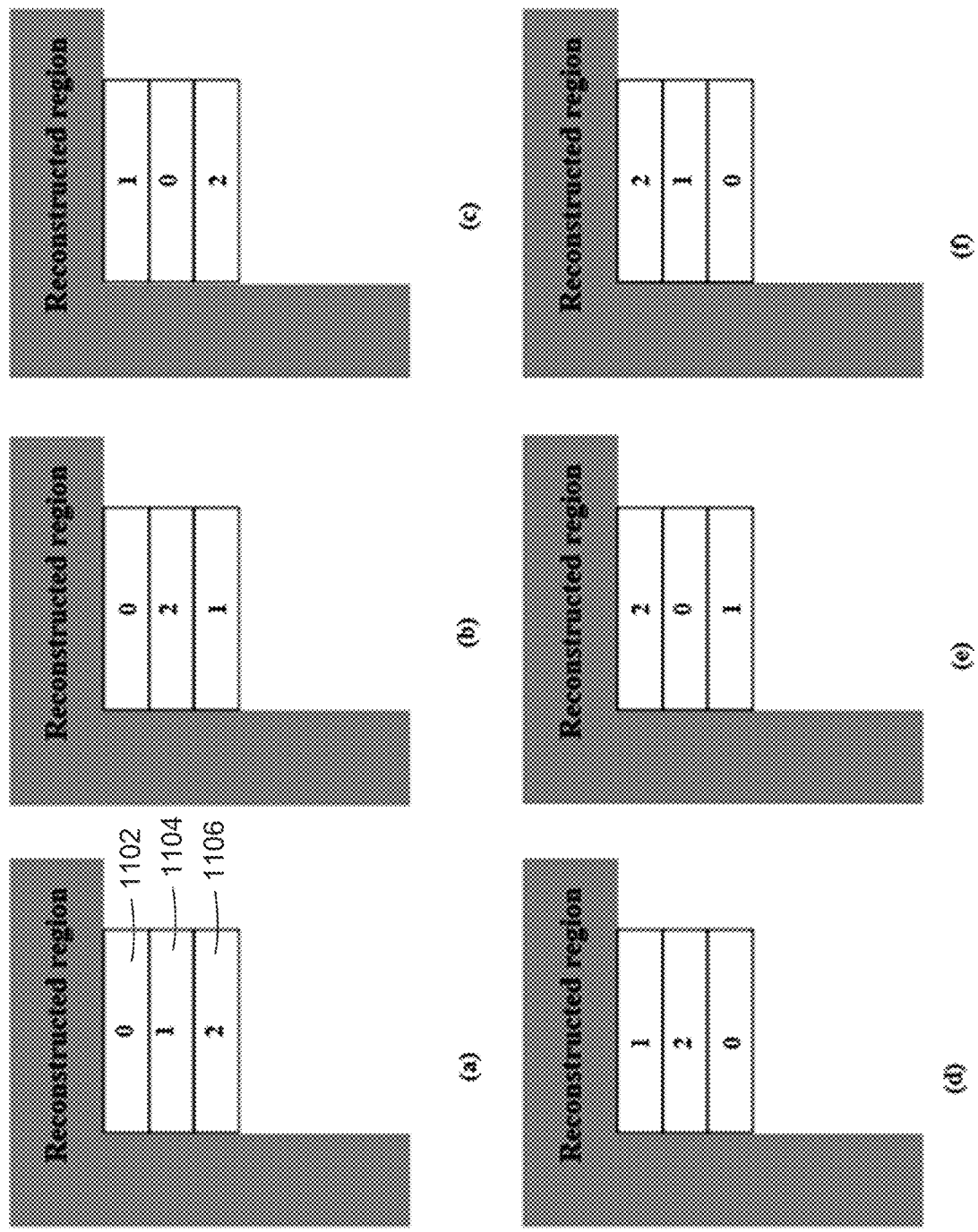
FIG. 11B is an illustration of exemplary coding orders when a horizontal ternary partition is performed on a video block in accordance with some implementations of the present disclosure.
Figure 12A:
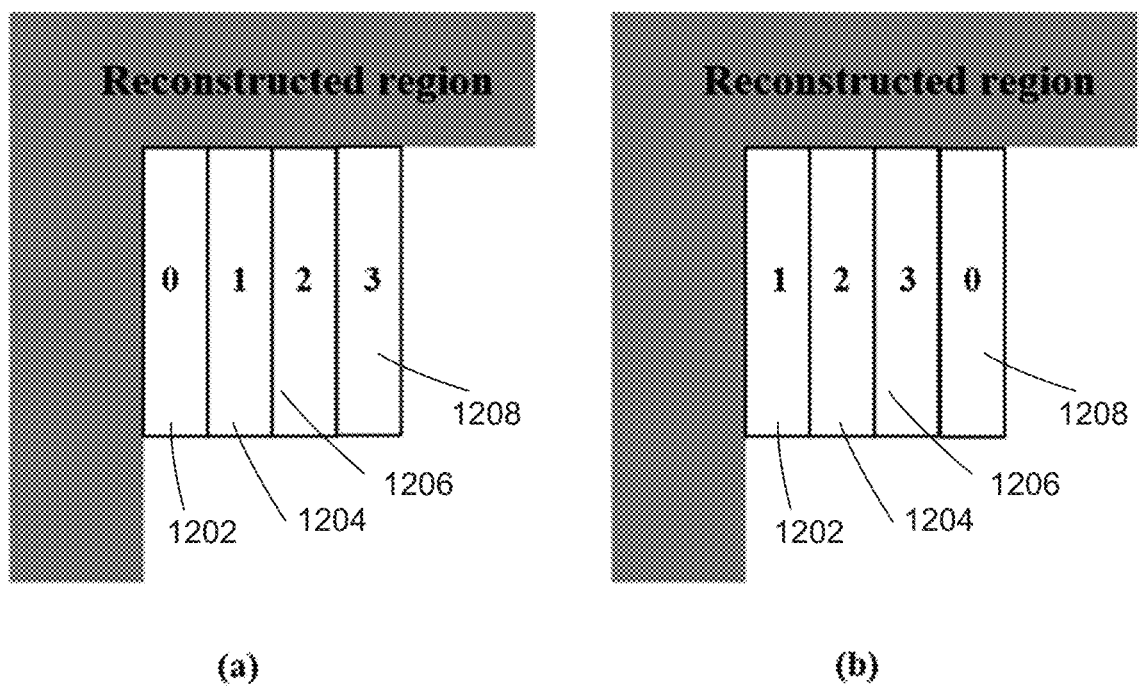
FIG. 12A is an illustration of exemplary coding orders for vertical sub-partition of a video block in an intra sub-partition (ISP) mode in accordance with some implementations of the present disclosure.
Figure 12B:
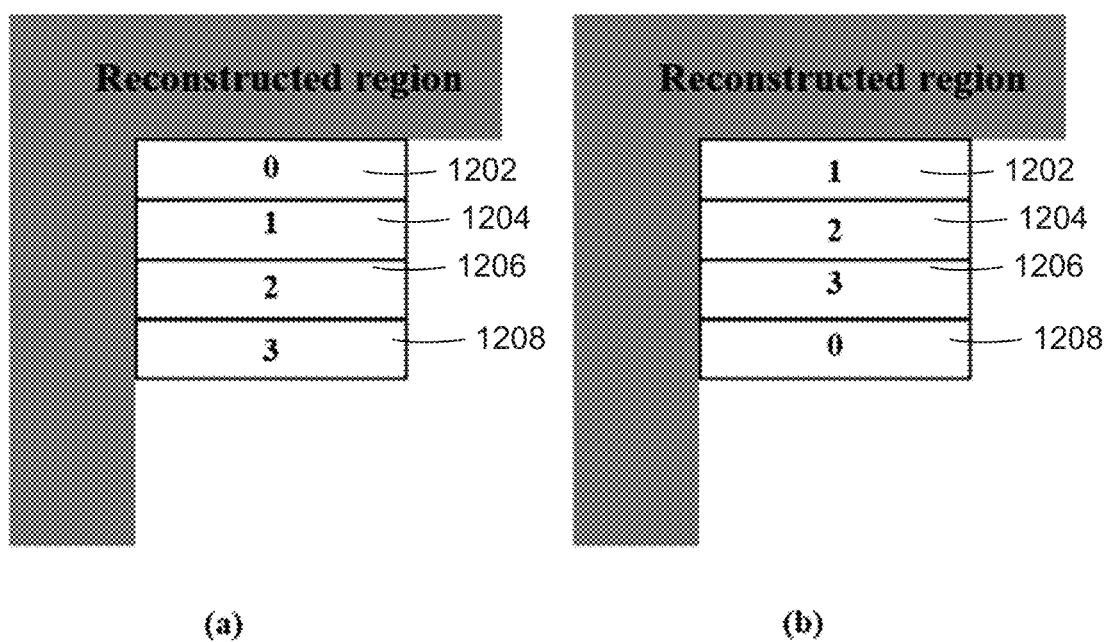
FIG. 12B is an illustration of exemplary coding orders for horizontal sub-partition of a video block in an ISP mode in accordance with some implementations of the present disclosure.

Then, the processor may determine an adaptive coding order for the plurality of video sub-blocks. The adaptive coding order may indicate an order to code the plurality of video sub-blocks. For example, the processor may determine a plurality of candidate coding orders for the plurality of video sub-blocks. Exemplary candidate coding orders for the quaternary partition of the video block are illustrated in FIG. 9; exemplary candidate coding orders for the vertical and horizontal binary partition of the video block are illustrated in FIGS. 10A and 10B, respectively; exemplary candidate coding orders for the vertical and horizontal ternary partition of the video block are illustrated in FIGS. 11A and 11B, respectively; and exemplary candidate coding orders for the vertical and horizontal sub-partition of the video block in the ISP are illustrated in FIGS. 12A and 12B, respectively.

The processor may select an adaptive coding order from the plurality of candidate coding orders using a rate-distortion optimization (RDO). For example, for each of the candidate coding orders, the processor may generate the subblocks progressively for the video block by performing operations like those described below with respect to the generation of a reconstructed block using the adaptive coding order, so that a plurality of candidate reconstructed blocks can be generated for the plurality of candidate coding orders, respectively. The processor may determine a plurality of rate-distortion (RD) costs for all the coding order candidates. The processor may select, from the plurality of candidate coding orders, a candidate coding order with a minimal RD cost among the plurality of RD costs to be the adaptive coding order.

Subsequently, the processor may generate a plurality of reconstructed sub-blocks for the plurality of video sub-blocks based on the adaptive coding order and the one or more reference blocks. For example, for a first video sub-block in the adaptive coding order, the processor may generate a first predictive sub-block for the first video sub-block based on the one or more reference blocks (e.g., the first predictive sub-block can be a weighted combination of the one or more reference blocks). The processor may generate a first reconstructed sub-block for the first video sub-block based on the first predictive sub-block (e.g., the first reconstructed sub-block can be a sum of the first predictive sub-block and a first residual sub-block corresponding to the first video sub-block). Then, for a second video sub-block subsequent to the first video sub-block in the adaptive coding order, the processor may generate a second predictive sub-block for the second video sub-block based on the first reconstructed sub-block and the one or more reference blocks (e.g., the second predictive sub-block can be a weighted combination of the first reconstructed sub-block and the one or more reference blocks). The processor may generate a second reconstructed sub-block for the second video sub-block based on the second predictive sub-block and a second residual sub-block corresponding to the second video sub-block.

Similarly, for a third video sub-block subsequent to the second video sub-block in the adaptive coding order, the processor may generate a third predictive sub-block for the third video sub-block based on one or more of (a) the first reconstructed sub-block, (b) the second reconstructed sub-block corresponding to the second video sub-block, and (c) the one or more reference blocks. The processor may generate a third reconstructed sub-block for the third video sub-block based on the third predictive sub-block and a third residual sub-block corresponding to the third video sub-block.

By performing similar operations, the processor may generate a plurality of reconstructed sub-blocks for the plurality of video sub-blocks according to the adaptive coding order, respectively. For example, as described above, a reconstructed subblock corresponding to the adaptive coding order may be generated by adding a corresponding predictive subblock with a corresponding residual subblock. The plurality of reconstructed sub-blocks corresponding to the plurality of video sub-blocks can be combined to form the reconstructed block corresponding to the adaptive coding order.

Further, the processor may generate a syntax element for signaling the adaptive coding order for the plurality of the video sub-blocks, which is described below in more detail.

As mentioned above, in existing designs of the ECM, a video block such as a CU is processed in a fixed raster scan order which may result in low prediction accuracy for some cases. Consistent with the present disclosure, an adaptive coding order (e.g., an adaptive CU order) is disclosed herein to improve the prediction accuracy. A video block can be further split into a plurality of video sub-blocks using a partition method, including a quaternary partition, a binary partition, or a ternary partition. The adaptive coding order (e.g., the adaptive CU order) for each partition method is described separately in the following.

Like HEVC, quadtree-based CU partition is retained in both VVC and ECM. In this case, a current CU can be split into four equal-size sub-CUs. In the existing designs, the four sub-CUs are only processed in a fixed CU scan order such as a raster scan order. Section (a) of FIG. 9 illustrates an example of the raster scan order. Therefore, when a sub-CU of the current CU is coded, only the neighboring CUs located above or left to the current CU can be utilized for prediction, which is ineffective if the spatial correlation of the sub-CUs is not along the left-top to right-bottom direction. To deal with the various video contents (e.g., with various spatial correlations), a more flexible scan order such as an adaptive coding order can be designed for the quaternary partition as depicted in FIG. 9.

Specifically, with respect to determination 802 of the adaptive coding order for the quaternary partition on a video block, the processor may perform the quaternary partition on the video block to split the video block into four video sub-blocks. The four video sub-blocks may include a top-left video sub-block 902, a top-right video sub-block 904, a bottom-left video sub-block 906, and a bottom-right video sub-block 908. A plurality of candidate coding orders for the four video sub-blocks may include various sequenced combinations of the top-left video sub-block 902, the top-right video sub-block 904, the bottom-left video sub-block 906, and the bottom-right video sub-block 908.

For example, the plurality of candidate coding orders may further include: a first coding order from the top-left video sub-block, the top-right video sub-block, the bottom-left video sub-block, to the bottom-right video sub-block, as shown in Section (a) of FIG. 9; a second coding order from the bottom-left video sub-block, the top-left video sub-block, the bottom-right video sub-block, to the top-right video sub-block, as shown in Section (b) of FIG. 9; a third coding order from the bottom-right video sub-block, the bottom-left video sub-block, the top-right video sub-block, to the top-left video sub-block, as shown in Section (c) of FIG. 9; a fourth coding order from the top-right video sub-block, the bottom-right video sub-block, the top-left video sub-block, to the bottom-left video sub-block, as shown in Section (d) of FIG. 9; a fifth coding order from the top-left video sub-block, the bottom-left video sub-block, the top-right video sub-block, to the bottom-right video sub-block, as shown in Section (e) of FIG. 9; a sixth coding order from the bottom-left video sub-block, the bottom-right video sub-block, the top-left video sub-block, to the top-right video sub-block, as shown in Section (f) of FIG. 9; a seventh coding order from the bottom-right video sub-block, the top-right video sub-block, the bottom-left video sub-block, to the top-left video sub-block, as shown in Section (g) of FIG. 9; and an eighth coding order from the top-right video sub-block, the top-left video sub-block, the bottom-right video sub-block, to the bottom-left video sub-block, as shown in Section (h) of FIG. 9.

The processor may select, from the plurality of candidate coding orders, a candidate coding order as the adaptive coding order. In some implementations, as described above, the processor may select a candidate coding order using a RDO.

Then, the processor may generate corresponding predictive sub-blocks for the four video sub-blocks, respectively, based on the adaptive coding order and one or more reference blocks for the video block. For example, assuming that the adaptive coding order is selected to be a candidate coding order shown in Section (h) of FIG. 9, which is a coding order from the top-right video sub-block, the top-left video sub-block, the bottom-right video sub-block, to the bottom-left video sub-block. Then, the top-right video sub-block can be firstly coded using reference samples located above and/or on the left of the video block for prediction, so that a first predictive sub-block can be generated for the top-right video sub-block based on the reference samples. A first reconstructed sub-block can be generated based on the first predictive sub-block and a first residual sub-block (e.g., residual samples) corresponding to the top-right video sub-block.

Next, as shown in Section (h) of FIG. 9, the top-left video sub-block can be coded. Not only the reference samples located above and/or on the left of the video block, but also the first reconstructed sub-block corresponding to the top-right video sub-block, can be used for the coding of the top-left video sub-block to improve the prediction accuracy of the top-left video sub-block. As a result, a second predictive sub-block can be generated for the top-left video sub-block based on: (a) the reference samples located above and/or on the left of the video block; and/or (b) the first reconstructed sub-block. That is, samples in the first reconstructed sub-block can also be used as additional reference samples for the generation of the second predictive sub-block. A second reconstructed sub-block can be generated based on the second predictive sub-block and a second residual sub-block corresponding to the top-left video sub-block.

Likewise, shown in Section (h) of FIG. 9, the bottom-right video sub-block can be coded to generate a third predictive sub-block based on one or more of: (a) the reference samples on the left of the video block; (b) the first reconstructed sub-block corresponding to the top-right video sub-block; and (c) the second reconstructed sub-block corresponding to the top-left video sub-block. That is, samples in the first and second reconstructed sub-blocks can also be used as additional reference samples for the generation of the third predictive sub-block. A third reconstructed sub-block can be generated based on the third predictive sub-block and a third residual sub-block corresponding to the bottom-right video sub-block.

Subsequently, shown in Section (h) of FIG. 9, the bottom-left video sub-block can be coded to generate a fourth predictive sub-block based on one or more of: (a) the reference samples on the left of the video block; (b) the first reconstructed sub-block corresponding to the top-right video sub-block; (c) the second reconstructed sub-block corresponding to the top-left video sub-block; and (d) the third reconstructed sub-block corresponding to the bottom-right video sub-block. That is, samples in the first, second, and third reconstructed sub-blocks can also be used as additional reference samples for the generation of the fourth predictive sub-block. A fourth reconstructed sub-block can be generated based on the fourth predictive sub-block and a fourth residual sub-block corresponding to the bottom-left video sub-block.

As a result, a reconstructed block can be formed for the video block by combining the first, second, third, and fourth reconstructed sub-blocks together.

Consistent with the present disclosure, by adopting the adaptive coding order to provide more flexibility for the prediction of the video sub-blocks, the accuracy of the prediction can be improved because of the reduction of the distance between the video sub-blocks and their corresponding reference samples. For example, when coding the bottom-right video sub-block as shown in Section (h) of FIG. 9, samples in the first reconstructed sub-block (corresponding to the top-right video sub-block) and the second reconstructed sub-block (corresponding to the top-left video sub-block) are used instead of the reference samples above the video block, because the samples in the first and second reconstructed sub-blocks have shorter distances to the bottom-right video sub-block than the reference samples above the video block.

With respect to determination 804 of the adaptive coding order for the binary partition, the processor may perform the binary partition on the video block to split the video block into two video sub-blocks horizontally (as shown in FIG. 10B) or vertically (as shown in FIG. 10A). The two video sub-blocks may include a first video sub-block 1002 and a second video sub-block 1004. The processor may determine a plurality of candidate coding orders for the two video sub-blocks, which may include: (a) a first coding order from the first video sub-block 1002 to the second video sub-block 1004 (as shown in Section (a) of FIG. 10A or FIG. 10B); and (b) a second coding order from the second video sub-block 1004 to the first video sub-block 1002 (as shown in Section (b) of FIG. 10A or FIG. 10B). The processor may select an adaptive coding order from the plurality of candidate coding orders by performing operations like those described above. Through the selection of the adaptive coding order, the coding order of the two video sub-blocks is not limited to the first coding order from the first video sub-block 1002 to the second video sub-block 1004, but also can be the second coding order from the second video sub-block 1004 to the first video sub-block 1002.

Referring to FIGS. 10A and 10B, the numbers "0" and "1" in the rectangles represent the coding order of the corresponding video sub-blocks, with the "0" sub-block being coded before the "1" sub-block. In FIG. 10A, the first video sub-block 1002 and the second video sub-block 1004 are a left video sub-block and a right video sub-block, respectively, due to a vertical binary partition of the video block. In FIG. 10B, the first video sub-block 1002 and the second video sub-block 1004 are a top video sub-block and a bottom video sub-block, respectively, due to a horizontal binary partition of the video block.

In Section (a) of FIG. 10A or FIG. 10B, the adaptive coding order is from the first video sub-block 1002 to the second video sub-block 1004 so that the first video sub-block is coded before the second video sub-block. For example, the first video sub-block can be coded using reference samples located above and/or on the left of the video block, so that a first predictive sub-block can be generated for the first video sub-block based on the reference samples. A first reconstructed sub-block can be generated based on the first predictive sub-block and a first residual sub-block corresponding to the first video sub-block. Then, the second video sub-block can be coded using (a) the reference samples located above and/or on the left of the video block and (b) the first reconstructed sub-block corresponding to the first video sub-block, so that a second predictive sub-block can be generated for the second video sub-block.

In Section (b) of FIG. 10A or FIG. 10B, the adaptive coding order is from the second video sub-block 1004 to the first video sub-block 1002. The second video sub-block is coded before the first video sub-block. For example, the second video sub-block can be coded using reference samples located above and/or on the left of the video block, so that a first predictive sub-block can be generated for the second video sub-block based on the reference samples. A first reconstructed sub-block can be generated based on the first predictive sub-block and a first residual sub-block corresponding to the second video sub-block. Then, the first video sub-block can be coded using (a) the reference samples located above and/or on the left of the video block and (b) the first reconstructed sub-block corresponding to the second video sub-block, so that a second predictive sub-block can be generated for the first video sub-block.

Referring to FIG. 8 again, with respect to determination 806 of the adaptive coding order for the ternary partition, the processor may perform the ternary partition on the video block to split the video block into three video sub-blocks horizontally (as shown in FIG. 11B) or vertically (as shown in FIG. 11A). The three video sub-blocks may include a first video sub-block 1102, a second video sub-block 1104, and a third video sub-block 1106. The processor may determine a plurality of candidate coding orders for the three video sub-blocks, which may include various sequenced combinations of the first video sub-block 1102, the second video sub-block 1104, and the third video sub-block 1106. Since the total number of video sub-blocks for the ternary partition is three, there can be six coding orders for the horizontal or vertical ternary partition, respectively. In FIGS. 11A and 11B, the numbers "0," "1," and "2" in the rectangles represent a coding order of the corresponding video sub-blocks, with the "0" sub-block being coded before the "1" sub-block, and the "1" sub-block being coded before the "2" sub-block.

For example, the plurality of candidate coding orders may include a first coding order from the first video sub-block, the second video sub-block, to the third video sub-block (as shown in Section (a) of FIG. 11A or FIG. 11B); a second coding order from the first video sub-block, the third video sub-block, to the second video sub-block (as shown in Section (b) of FIG. 11A or FIG. 11B); a third coding order from the second video sub-block, the first video sub-block, to the third video sub-block (as shown in Section (c) of FIG. 11A or FIG. 11B); a fourth coding order from the third video sub-block, the first video sub-block, to the second video sub-block (as shown in Section (d) of FIG. 11A or FIG. 11B); a fifth coding order from the second video sub-block, the third video sub-block, to the first video sub-block (as shown in Section (e) of FIG. 11A or FIG. 11B); and a sixth coding order from the third video sub-block, the second video sub-block, to the first video sub-block (as shown in Section (f) of FIG. 11A or FIG. 11B).

The processor may select an adaptive coding order from the plurality of candidate coding orders by performing operations like those described above. For example, in Section (a) of FIG. 11A or FIG. 11B, the adaptive coding order is from the first video sub-block, to the second video sub-block, and then to the third video sub-block. The first video sub-block can be coded using reference samples located above and/or on the left of the video block, so that a first predictive sub-block can be generated for the first video sub-block based on the reference samples. A first reconstructed sub-block can be generated based on the first predictive sub-block and a first residual sub-block corresponding to the first video sub-block. Then, the second video sub-block can be coded using (a) the reference samples located above and/or on the left of the video block and (b) the first reconstructed sub-block corresponding to the first video sub-block, so that a second predictive sub-block can be generated for the second video sub-block. A second reconstructed sub-block can be generated based on the second predictive sub-block and a second residual sub-block corresponding to the second video sub-block. Next, the third video sub-block can be coded using one or more of: (a) the reference samples located above and/or on the left of the video block; (b) the first reconstructed sub-block corresponding to the first video sub-block; and (c) the second reconstructed sub-block corresponding to the second video sub-block, so that a third predictive sub-block can be generated for the third video sub-block.

In another example, in Section (b) of FIG. 11A or FIG. 11B, the adaptive coding order is from the first video sub-block, to the third video sub-block, and then to the second video sub-block. The first video sub-block can be coded using reference samples located above and/or on the left of the video block, so that a first predictive sub-block can be generated for the first video sub-block based on the reference samples. A first reconstructed sub-block can be generated based on the first predictive sub-block and a first residual sub-block corresponding to the first video sub-block. Then, the third video sub-block can be coded using (a) the reference samples located above the video block and (b) the first reconstructed sub-block corresponding to the first video sub-block, so that a second predictive sub-block can be generated for the third video sub-block. A second reconstructed sub-block can be generated based on the second predictive sub-block and a second residual sub-block corresponding to the third video sub-block. Next, the second video sub-block can be coded using one or more of: (a) the reference samples located above the video block; (b) the first reconstructed sub-block corresponding to the first video sub-block; and (c) the second reconstructed sub-block corresponding to the third video sub-block, so that a third predictive sub-block can be generated for the second video sub-block.

The following Table 4 provides a syntax element design for the adaptive coding order with the quaternary, binary, and ternary partitions, respectively. Syntax elements qt_cu_scan_order_idx, bt_cu_scan_order_idx, and tt_cu_scan_order_idx are introduced to indicate the adaptive coding order when processing video blocks such as CUs for the quaternary, binary, and ternary partitions, respectively.

TABLE 4

| | Descriptor |
|---|---|
| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | |
|   if( ( allowSplitBtVer \|\| allowSplitBtHor \|\| allowSplitTtVer \|\| allowSplitTtHor \|\| | |
|       allowSplitQt ) && ( x0 + cbWidth <= pps_pic_width_in_luma_samples ) && | |
|       ( y0 + cbHeight <= pps_pic_height_in_luma_samples ) ) | |
|     split_cu_flag | ae(v) |
|   if( pps_cu_qp_delta_enabled_flag && qgOnY && cbSubdiv <= CuQpDeltaSubdiv ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   if( sh_cu_chroma_qp_offset_enabled_flag && qgOnC && | |
|     cbSubdiv <= CuChromaQpOffsetSubdiv ) { | |
|     IsCuChromaQpOffsetCoded = 0 | |
|     $CuQpOffset_{Cb} = 0$ | |
|     $CuQpOffset_{Cr} = 0$ | |
|     $CuQpOffset_{CbCr} = 0$ | |
|   } | |
|   if( split_cu_flag ) { | |
|     if( ( allowSplitBtVer \|\| allowSplitBtHor \|\| allowSplitTtVer \|\| | |

TABLE 4-continued

| | Descriptor |
|---|---|
| allowSplitTtHor ) && | |
|     allowSplitQt ) | |
|       split_qt_flag | ae(v) |
|   if( !split_qt_flag ) { | |
|     if( ( allowSplitBtHor \|\| allowSplitTtHor ) && ( allowSplitBtVer \|\| allowSplitTtVer ) ) | |
|       mtt_split_cu_vertical_flag | ae(v) |
|     if( ( allowSplitBtVer && allowSplitTtVer && mtt_split_cu_vertical_flag ) \|\| | |
|       ( allowSplitBtHor && allowSplitTtHor && !mtt_split_cu_vertical_flag ) ) | |
|       mtt_split_cu_binary_flag | ae(v) |
|   } | |
|   if (split_qt_flag){ | |
|     qt_cu_scan_order_idx | ae(v) |
|   } | |
|   else{ | |
|     if(MttSplitMode[ x0 ][ y0 ][ mttDepth ] = = SPLIT_BT_VER \|\| MttSplitMode[ x0 ][ y0 ][ mttDepth ] = = SPLIT_BT_HOR){ | |
|       bt_cu_scan_order_idx | ae(v) |
|     } | |
|     else{ | |
|       tt_cu_scan_order_idx | ae(v) |
|     } | |
|   } | |
|   if( ModeTypeCondition = = 1) | |
|     modeType = MODE_TYPE_INTRA | |
|   else if( ModeTypeCondition = = 2 ) { | |
|     non_inter_flag | ae(v) |
|     modeType = non_inter_flag ? MODE_TYPE_INTRA : MODE_TYPE_INTER | |
|   } else | |
|     modeType = modeTypeCurr | |
|   treeType = ( modeType = = MODE_TYPE_INTRA ) ? DUAL_TREE_LUMA : treeTypeCurr | |
|   if( !split_qt_flag ) { | |
|     if( MttSplitMode[ x0 ][ y0 ][ mttDepth ] = = SPLIT_BT_VER ) { | |
|       depthOffset += ( x0 + cbWidth > pps_pic_width_in_luma_samples ) ? 1 : 0 | |
|       x1 = x0 + ( cbWidth/2 ) | |
|       If(bt_cu_scan_order_idx == 0){ | |
|         coding_tree( x0, y0, cbWidth / 2, cbHeight, qgOnY, qgOnC, cbSubdiv + 1, cqtDepth, mttDepth + 1, depthOffset, 0, treeType, modeType ) | |
|         if( x1 < pps_pic_width_in_luma_samples ) | |
|           coding_tree( x1, y0, cbWidth / 2, cbHeight, qgOnY, qgOnC, cbSubdiv + 1, cqtDepth, mttDepth + 1, depthOffset, 1, treeType, modeType ) | |
|       } | |
|       else{ | |
|         if( x1 < pps_pic_width_in_luma_samples ) | |
|           coding_tree( x1, y0, cbWidth / 2, cbHeight, qgOnY, qgOnC, cbSubdiv + 1, cqtDepth, mttDepth + 1, depthOffset, 1, treeType, modeType ) | |
|         coding_tree( x0, y0, cbWidth / 2, cbHeight, qgOnY, qgOnC, cbSubdiv + 1, cqtDepth, mttDepth + 1, depthOffset, 0, treeType, modeType ) | |
|       } | |
|     } else if( MttSplitMode[ x0 ][ y0 ][ mttDepth ] = = SPLIT_BT_HOR ) { | |
|       depthOffset += ( y0 + cbHeight > pps_pic_height_in_luma_samples ) ? 1 : 0 | |
|       y1 = y0 + (cbHeight / 2) | |
|       if(bt_cu_scan_order_idx == 0){ | |
|         coding_tree( x0, y0, cbWidth, cbHeight / 2, qgOnY, qgOnC, cbSubdiv + 1, cqtDepth, mttDepth + 1, depthOffset, 0, treeType, modeType ) | |
|         if( y1 < pps_pic_height_in_luma_samples ) | |
|           coding_tree( x0, y1, cbWidth, cbHeight / 2, qgOnY, qgOnC, cbSubdiv + 1, cqtDepth, mttDepth + 1, depthOffset, 1, treeType, modeType ) | |
|       } | |
|       else{ | |
|         if( y1 < pps_pic_height_in_luma_samples ) | |
|           coding_tree( x0, y1, cbWidth, cbHeight / 2, qgOnY, qgOnC, cbSubdiv + 1, cqtDepth, mttDepth + 1, depthOffset, 1, treeType, modeType ) | |
|         coding_tree( x0, y0, cbWidth, cbHeight / 2, qgOnY, qgOnC, cbSubdiv + 1, | |

TABLE 4-continued

| | Descriptor |
|---|---|

```
              cqtDepth, mttDepth + 1, depthOffset, 0, treeType, modeType )
          }
        } else if( MttSplitMode[ x0 ][ y0 ][ mttDepth ] = = SPLIT_TT_VER ) {
          x1 = x0 + ( cbWidth / 4 )
          x2 = x0 + ( 3 * cbWidth / 4 )
          qgNextOnY = qgOnY && ( cbSubdiv + 2 <= CuQpDeltaSubdiv )
          qgNextOnC = qgOnC && ( cbSubdiv + 2 <=
CuChromaQpOffsetSubdiv )
          coding_tree( x0, y0, cbWidth / 4, cbHeight, qgNextOnY, qgNextOnC,
cbSubdiv + 2,
  cqtDepth, mttDepth + 1, depthOffset, 0, treeType, modeType )
          coding_tree( x1, y0, cbWidth / 2, cbHeight, qgNextOnY, qgNextOnC,
cbSubdiv + 1,
  cqtDepth, mttDepth + 1, depthOffset, 1, treeType, modeType )
          coding_tree( x2, y0, cbWidth / 4, chHeight, qgNextOnY, qgNextOnC,
cbSubdiv + 2,
  cqtDepth, mttDepth + 1, depthOffset, 2, treeType, modeType )
          coding_tree( x0[tt_cu_scan_order_idx], y0, cbWidth[tt_cu_scan_
order_idx], cbHeight, qgNextOnY, qgNextOnC, cbSubdiv + 2,
cqtDepth, mttDepth + 1, depthOffset, 0, treeType, modeType )
          coding_tree( x1[tt_cu_scan_order_idx], y0, cbWidth[tt_cu_scan_
order_idx], cbHeight, qgNextOnY, qgNextOnC, cbSubdiv + 1,
cqtDepth, mttDepth + 1, depthOffset, 1, treeType, modeType )
          coding_tree( x2[tt_cu_scan_order_idx], y0, cbWidth[tt_cu_scan_
order_idx], cbHeight, qgNextOnY, qgNextOnC, cbSubdiv + 2,
cqtDepth, mttDepth + 1, depthOffset, 2, treeType, modeType )
        } else { /* SPLIT_TT_HOR */
          y1 = y0 + (cbHeight / 4 )
          y2 = y0 + ( 3 * cbHeight / 4 )
          qgNextOnY = qgOnY && ( cbSubdiv + 2 <= CuQpDeltaSubdiv )
          qgNextOnC = qgOnC && ( cbSubdiv + 2 <=
CuChromaQpOffsetSubdiv )
          coding_tree( x0, y0, cbWidth, cbHeight / 4, qgNextOnY, qgNextOnC,
cbSubdiv + 2,
  cqtDepth, mttDepth + 1, depthOffset, 0, treeType, modeType )
          coding_tree( x0, y1, cbWidth, chHeight / 2, qgNextOnY, qgNextOnC,
cbSubdiv + 1,
  cqtDepth, mttDepth + 1, depthOffset, 1, treeType, modeType )
          coding_tree( x0, y2, cbWidth, cbHeight / 4, qgNextOnY, qgNextOnC,
cbSubdiv + 2,
  cqtDepth, mttDepth + 1, depthOffset, 2, treeType, modeType )
          coding_tree( x0, y0[tt_cu_scan_order_idx], cbWidth, cbHeight [tt_
cu_scan_order_idx], qgNextOnY, qgNextOnC, cbSubdiv + 2,
cqtDepth, mttDepth + 1, depthOffset, 0, treeType, modeType )
          coding_tree( x0, y1[tt_cu_scan_order_idx], cbWidth, cbHeight[tt_
cu_scan_order_idx], qgNextOnY, qgNextOnC, cbSubdiv + 1,
cqtDepth, mttDepth + 1, depthOffset, 1, treeType, modeType )
          coding_tree( x0, y2[tt_cu_scan_order_idx], cbWidth, cbHeight[tt_cu_
scan_order_idx], qgNextOnY, qgNextOnC, cbSubdiv + 2,
cqtDepth, mttDepth + 1, depthOffset, 2, treeType, modeType )
        }
      } else {
        x1 = x0 + (cbWidth / 2 )
        y1 = y0 + (cbHeight / 2 )
        coding_tree( x0, y0, cbWidth / 2, cbHeight / 2, qgOnY, qgOnC,
cbSubdiv + 2,
                    cqtDepth + 1, 0, 0, 0, treeType, modeType )
        if( x1 < pps_pic_width_in_luma_samples )
          coding_tree( x1, y0, cbWidth / 2, chHeight / 2, qgOnY, qgOnC,
cbSubdiv + 2,
                    cqtDepth + 1, 0, 0, 1, treeType, modeType )
        if( y1 < pps_pic_height_in_luma_samples )
          coding_tree( x0, y1, cbWidth / 2, cbHeight / 2, qgOnY, qgOnC,
cbSubdiv + 2,
                    cqtDepth + 1, 0, 0, 2, treeType, modeType )
        if( y1 < pps_pic_height_in_luma_samples && x1 <
pps_pic_width_in_luma_samples )
          coding_tree( x1, y1, cbWidth / 2, cbHeight / 2, qgOnY, qgOnC,
cbSubdiv + 2,
                    cqtDepth + 1, 0, 0, 3, treeType, modeType )
        if( x0[qt_scan_order_idx] < pps_pic_width_in_luma_samples &&
y0[qt_scan_order_idx] < pps_pic_height_in_luma_samples )
          coding_tree( x0[qt_scan_order_idx], y0[qt_scan_order_idx],
cbWidth / 2, cbHeight / 2, qgOnY, qgOnC, cbSubdiv + 2,
cqtDepth + 1, 0, 0, 0, treeType, modeType )
        if( x1[qt_scan_order_idx] < pps_pic_width_in_luma_samples &&
y0[qt_scan_order_idx] < pps_pic_height_in_luma_samples )
          coding_tree( x1[qt_scan_order_idx], y0[qt_scan_order_idx],
```

TABLE 4-continued

Descriptor

```
          cbWidth / 2, cbHeight / 2, qgOnY, qgOnC, cbSubdiv + 2,
cqtDepth + 1, 0, 0, 1, treeType, modeType )
          if(x0[qt_scan_order_idx] < pps_pic_width_in_luma_samples &&
y1[qt_scan_order_idx] < pps_pic_height_in_luma_samples )
              coding_tree( x0[qt_scan_order_idx], y1[qt_scan_order_idx],
cbWidth / 2, cbHeight / 2, qgOnY, qgOnC, cbSubdiv + 2,
cqtDepth + 1, 0, 0, 2, treeType, modeType )
          if( y1[qt_scan_order_idx] < pps_pic_height_in_luma_samples &&
x1[qt_scan_order_idx] < pps_pic_width_in_luma_samples )
              coding_tree( x1[qt_scan_order_idx], y1[qt_scan_order_idx],
cbWidth / 2, cbHeight / 2, qgOnY, qgOnC, cbSubdiv + 2,
cqtDepth + 1, 0, 0, 3, treeType, modeType )
          }
          if( modeTypeCurr = = MODE_TYPE_ALL && modeType = =
MODE_TYPE_INTRA )
              coding_tree( x0, y0, cbWidth, cbHeight, 0, qgOnC, cbSubdiv, cqtDepth,
mttDepth, 0, 0,
                              DUAL_TREE_CHROMA, modeType )
      } else
        coding_unit( x0, y0, cbWidth, cbHeight, cqtDepth, treeTypeCurr,
modeTypeCurr )
}
```

In the above, the adaptive coding order for the quaternary, binary, or ternary partition is described, and each video block such as each CU has its own intra prediction mode, i.e., intra prediction direction. In VVC and ECM, the ISP mode is adopted in which a video block such as a CU can be further split into several transform units (TUs). These TUs share the same intra prediction mode but has their own transform types. As illustrated in FIGS. 7A-7B, a 4×8 or 8×4 CU can be split into two sub-partitions horizontally or vertically, respectively, whereas a CU with another block size can be split into four sub-partitions horizontally or vertically.

In the existing designs of the ISP mode, a coding order for the sub-partitions is fixed. For example, for the horizontally split sub-partitions, they are only processed from above to bottom. For the vertically split sub-partitions, they are only processed from left to right. The fixed coding order of the sub-partitions may result in low prediction accuracy of the video block. Consistent with the present disclosure, an adaptive coding order (e.g., an adaptive sub-partition order) can be applied in the ISP mode.

Referring to FIG. 8 again, with respect to determination 808 of the adaptive coding order for the ISP mode, the processor may apply the ISP mode to split the video block into a plurality of sub-partitions. The plurality of sub-partitions share a common intra prediction mode with respective transform types. That is, the video block can be split into the plurality of sub-partitions horizontally or vertically. The processor may determine a plurality of candidate coding orders for the plurality of sub-partitions. The plurality of candidate coding orders may include various sequenced combinations of the plurality of sub-partitions. The processor may select an adaptive coding order from the various sequenced combinations of the plurality of sub-partitions by performing operations like those described above for the selection of the adaptive coding order for the quaternary, binary, or ternary partition.

In some implementations, the plurality of sub-partitions may include a first sub-partition and a second sub-partition. For example, for a 4×8 or 8×4 CU, it can be split into a first sub-partition and a second sub-partition horizontally or vertically. The plurality of candidate coding orders may include (a) a first coding order from the first sub-partition to the second sub-partition and (b) a second coding order from the second sub-partition to the first sub-partition. The adaptive coding order can be selected to be one of the first and second coding orders.

In some implementations, the plurality of sub-partitions may include a first sub-partition, a second sub-partition, a third sub-partition, and a fourth sub-partition. For example, for a CU with a size larger than 4×8 or 8×4, it can be split into a first sub-partition, a second sub-partition, a third sub-partition, and a fourth sub-partition horizontally (as shown in FIG. 12B) or vertically (as shown in FIG. 12A). The plurality of candidate coding orders may include various sequenced combinations of the first, second, third, and fourth sub-partitions. For example, the plurality of candidate coding orders may include a total of 4!=4*3*2*1=24 sequenced combinations of the first, second, third, and fourth sub-partitions. Two exemplary candidate coding orders for the vertical partition are shown in FIG. 12A, and two exemplary candidate coding orders for the horizontal partition are shown in FIG. 12B. The adaptive coding order can be one of the various sequenced combinations of the first, second, third, and fourth sub-partitions.

For example, referring to FIG. 12A or 12B, the video block is split into a first sub-partition 1202, a second sub-partition 1204, a third sub-partition 1206, and a fourth sub-partition 1208. The numbers "0," "1," "2," and "3" in the rectangles represent a coding order of the corresponding sub-partition, e.g., from the "0" sub-partition, the "1" sub-partition, the "2" sub-partition, to the "3" sub-partition.

In Section (a) of FIG. 12A or FIG. 12B, the adaptive coding order is from the first sub-partition, the second sub-partition, to the third sub-partition, and then to the fourth sub-partition. The first sub-partition can be coded using reference samples located above and/or on the left of the video block, so that a first predictive sub-block can be generated for the first sub-partition based on the reference samples. A first reconstructed sub-block can be generated based on the first predictive sub-block and a first residual sub-block corresponding to the first sub-partition. Then, the second sub-partition can be coded using (a) the reference samples located above the video block and (b) the first reconstructed sub-block corresponding to the first sub-partition, so that a second predictive sub-block can be generated for the second sub-partition. A second reconstructed sub-block can be generated based on the second predictive sub-block and a second residual sub-block corresponding to the second sub-partition. Next, the third sub-partition can be coded using one or more of: (a) the reference samples located above and/or on the left of the video block; (b) the first reconstructed sub-block corresponding to the first sub-partition; and (c) the second reconstructed sub-block corresponding to the second sub-partition, so that a third predictive sub-block can be generated for the third sub-partition. Subsequently, the fourth sub-partition can be coded using one or more of: (a) the reference samples located above and/or on the left of the video block; (b) the first reconstructed sub-block corresponding to the first sub-partition; (c) the second reconstructed sub-block corresponding to the second sub-partition; and (d) the third reconstructed sub-block corresponding to the third sub-partition, so that a fourth predictive sub-block can be generated for the fourth sub-partition.

In Section (b) of FIG. 12A or FIG. 12B, the adaptive coding order is from the fourth sub-partition 1208, the first sub-partition 1202, to the second sub-partition 1204, and then to the third sub-partition 1206. Firstly, the fourth sub-partition 1208 can be coded using reference samples located above and/or on the left of the video block, so that a first predictive sub-block can be generated for the fourth sub-partition 1208 based on the reference samples. A first reconstructed sub-block can be generated based on the first predictive sub-block and a first residual sub-block corresponding to the fourth sub-partition 1208. Then, the first sub-partition 1202 can be coded using one or more of: (a) the reference samples located above and/or on the left of the video block; and (b) the first reconstructed sub-block corresponding to the fourth sub-partition 1208, so that a second predictive sub-block can be generated for the first sub-partition 1202. A second reconstructed sub-block can be generated based on the second predictive sub-block and a second residual sub-block corresponding to the first sub-partition 1202. Next, the second sub-partition 1204 can be coded using one or more of: (a) the reference samples located above and/or on the left of the video block; (b) the first reconstructed sub-block corresponding to the fourth sub-partition 1208; and (c) the second reconstructed sub-block corresponding to the first sub-partition 1202, so that a third predictive sub-block can be generated for the second sub-partition 1204. Subsequently, the third sub-partition 1206 can be coded using one or more of: (a) the reference samples located above and/or on the left of the video block; (b) the first reconstructed sub-block corresponding to the fourth sub-partition 1208; (c) the second reconstructed sub-block corresponding to the first sub-partition 1202; and (d) the third reconstructed sub-block corresponding to the second sub-partition 1204, so that a fourth predictive sub-block can be generated for the third sub-partition 1206. That is, in Section (b) of FIG. 12A or FIG. 12B, the first and fourth sub-partitions 1202, 1208 are coded before the second and third sub-partitions 1204, 1206 located in the middle of the video block, so that reconstructed sub-blocks of the first and fourth sub-partitions 1202, 1208 can be utilized in the coding of the second and third sub-partitions 1204, 1206.

A syntax element design for the adaptive coding order in the ISP mode is provided below in Table 5. A syntax element "intra_subpartitions_scan_order_idx" is introduced to indicate the adaptive coding order for the sub-partitions.

TABLE 5

| | Descriptor |
|---|---|
| coding_unit( x0, y0, cbWidth, cbHeight, cqtDepth, treeType, modeType ) { | |
| ...... | |
|     if( CuPredMode[ chType ][ x0 ][ y0 ] = = MODE_INTRA \|\| | |
|         CuPredMode[ chType ][ x0 ][ y0 ] = = MODE_PLT ) { | |
|       if( treeType = = SINGLE_TREE \|\| treeType = = DUAL_TREE_LUMA ) { | |
|         if( pred_mode_plt_flag ) | |
|           palette_coding( x0, y0, cbWidth, cbHeight, treeType ) | |
|         else { | |
|           if( sps_bdpcm_enabled_flag && | |
|             cbWidth <= MaxTsSize && cbHeight <= MaxTsSize ) | |
|             intra_bdpcm_luma_flag | ae(v) |
|           if( intra_bdpcm_luma_flag ) | |
|             intra_bdpcm_luma_dir_flag | ae(v) |
|           else { | |
|             if( sps_mip_enabled_flag ) | |
|               intra_mip_flag | ae(v) |
|             if( intra_mip_flag ) { | |
|               intra_mip_transposed_flag[ x0 ][ y0 ] | ae(v) |
|               intra_mip_mode[ x0 ][ y0 ] | ae(v) |
|             } else { | |
|               if( sps_mrl_enabled_flag && ( ( y0 % CtbSizeY) > 0 ) ) | |
|                 intra_luma_ref_idx | ae(v) |
|               if( sps_isp_enabled_flag && intra_luma_ref_idx = = 0 && | |
|                 ( cbWidth <= MaxTbSizeY && cbHeight <= MaxTbSizeY ) & & | |
|                 ( cbWidth * cbHeight > MinTbSizeY * MinTbSizeY ) && | |
|                 !cu_act_enabled_flag ) | |
|                 intra_subpartitions_mode_flag | ae(v) |
|               if( intra_subpartitions_mode_flag = = 1 ) | |
|               if( intra_subpartitions_mode_flag = = 1 ){ | |
|                 intra_subpartitions_split_flag | ae(v) |
|                   intra_subpartitions_scan_order_idx | ae(v) |
|               } | |
|               if( intra_luma_ref_idx == 0 ) | |
|                 intra_luma_mpm_flag[ x0 ][ y0 ] | ae(v) |
|               if( intra_luma_mpm_flag[ x0 ][ y0 ] ) { | |

TABLE 5-continued

| | Descriptor |
|---|---|
| if( intra_luma_ref_idx = = 0 ) | |
|    intra_luma_not_planar_flag[ x0 ][ y0 ] | ae(v) |
| if( intra_luma_not_planar_flag[ x0 ][ y0 ] ) | |
|    intra_luma_mpm_idx[ x0 ][ y0 ] | ae(v) |
| ...... | |

Figure 13:
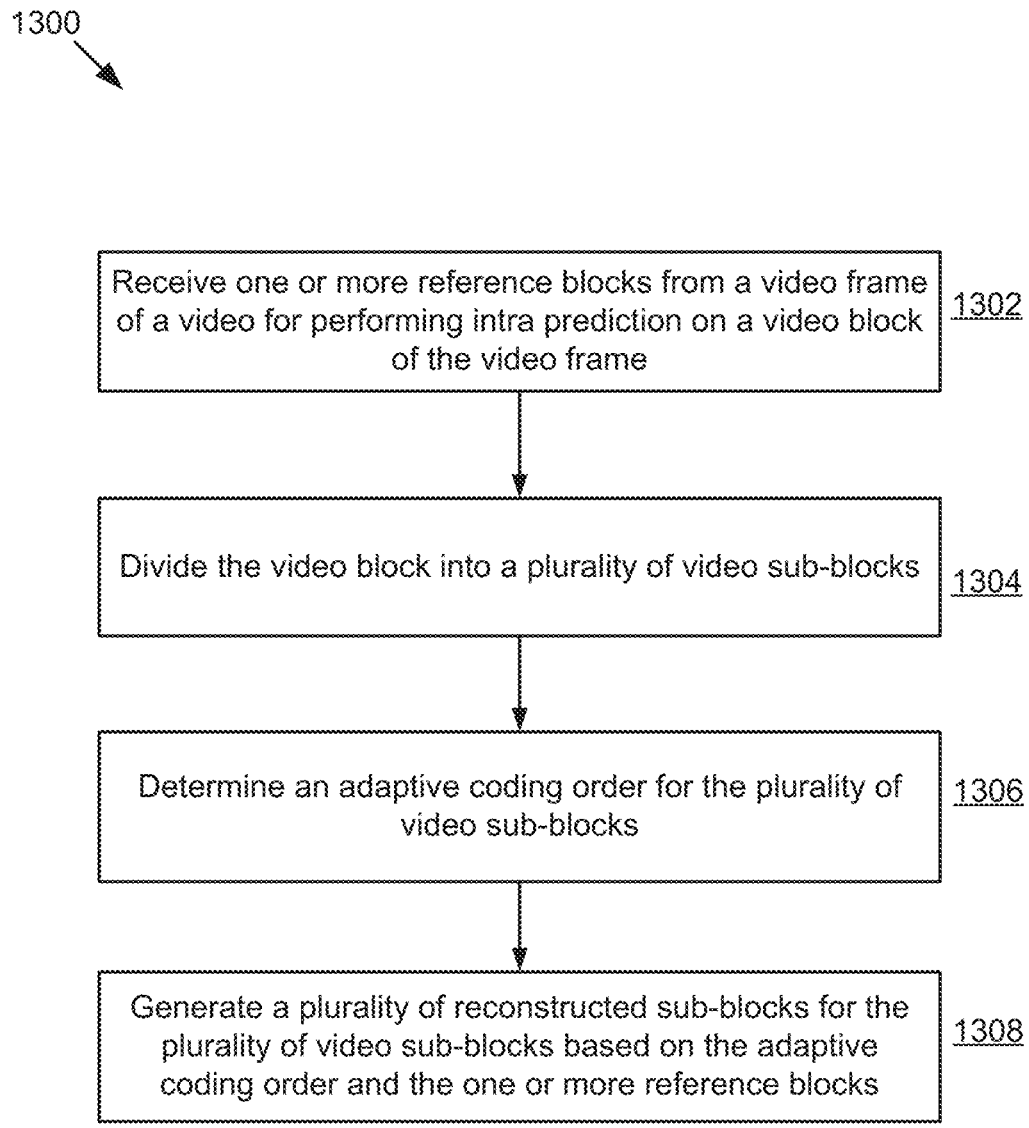
FIG. 13 is a flow chart of an exemplary method for intra prediction in video coding with an adaptive coding order in accordance with some implementations of the present disclosure.

FIG. 13 is a flow chart of an exemplary method 1300 for intra prediction in video coding with an adaptive coding order in accordance with some implementations of the present disclosure. Method 1300 may be implemented by a processor associated with video encoder 20 or video decoder 30, and may include steps 1302-1306 as described below. Some of the steps may be optional to perform the disclosure provided herein. Further, some of the steps may be performed simultaneously, or in a different order than shown in FIG. 13.

In step 1302, the processor may receive one or more reference blocks from a video frame of a video for performing intra prediction on a video block of the video frame.

In step 1304, the processor may divide the video block into a plurality of video sub-blocks according to a partition structure. For example, the processor may perform a binary, ternary, or quaternary partition on the video block to split the video block into two, three, or four video sub-blocks. In another example, the processor may apply the ISP mode to split the video block into a plurality of sub-partitions (e.g., two or four sub-partitions).

In step 1306, the processor may determine an adaptive coding order for the plurality of video sub-blocks based on the partition structure. For example, the processor may determine a plurality of candidate coding orders for the plurality of video sub-blocks, and select the adaptive coding order from the plurality of candidate coding orders. In some implementations, the adaptive coding order is adaptively determined for the video block based on the partition structure, as shown in FIGS. 9-12B. For example, for different partition structures, the adaptive coding order can be selected from different pluralities of candidate coding orders corresponding to the different partition structures, respectively.

In step 1308, the processor may generate a plurality of reconstructed sub-blocks for the plurality of video sub-blocks based on the adaptive coding order and the one or more reference blocks. An exemplary method for generating a plurality of reconstructed sub-blocks is described below in more details with reference to FIG. 14. The plurality of reconstructed sub-blocks may form a reconstructed block for the video block.

Figure 14:
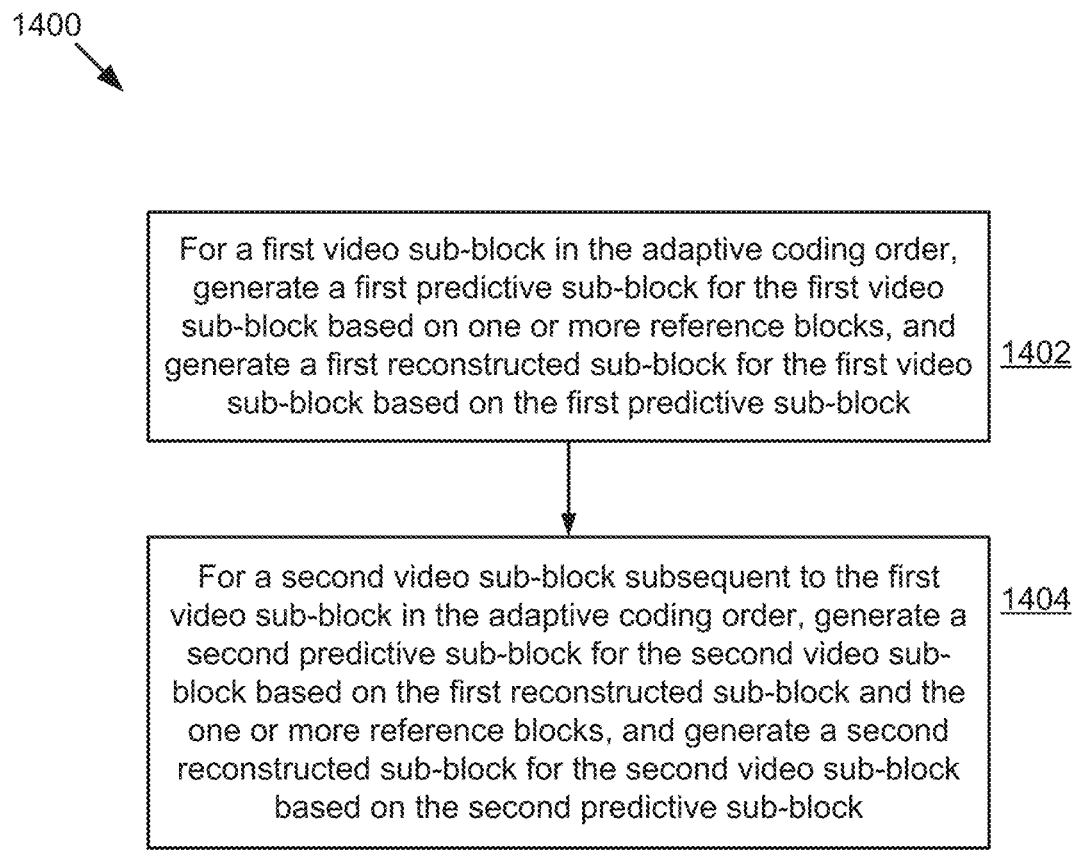
FIG. 14 is a flow chart of an exemplary method for generating a reconstructed block corresponding to a video block based on an adaptive coding order of the video block in accordance with some implementations of the present disclosure.

FIG. 14 is a flow chart of an exemplary method 1400 for generating a reconstructed block corresponding to a video block based on an adaptive coding order of the video block in accordance with some implementations of the present disclosure. Method 1400 may be implemented by a processor associated with video encoder 20 or video decoder 30, and may include steps 1402-1404 as described below. Some of the steps may be optional to perform the disclosure provided herein. Further, some of the steps may be performed simultaneously, or in a different order than shown in FIG. 14.

Method 1400 can be an exemplary implementation of step 1308 in method 1300, where the video block is divided into two video sub-blocks (e.g., a left video sub-block and a right video sub-block). The adaptive coding order is a coding order from a first video sub-block (e.g., the right video sub-block) to a second video sub-block (e.g., the left video sub-block).

In step 1402, for the first video sub-block in the adaptive coding order, the processor may generate a first predictive sub-block for the first video sub-block based on one or more reference blocks of the video block. The processor may generate a first reconstructed sub-block for the first video sub-block based on the first predictive sub-block.

In step 1404, for the second video sub-block subsequent to the first video sub-block in the adaptive coding order, the processor may generate a second predictive sub-block for the second video sub-block based on the first reconstructed sub-block and the one or more reference blocks. The processor may generate a second reconstructed sub-block for the second video sub-block based on the second predictive sub-block. The first and second reconstructed sub-blocks may form a reconstructed block for the video block with the two video sub-blocks.

FIG. 15 shows a computing environment 1510 coupled with a user interface 1550, according to some implementations of the present disclosure. The computing environment 1510 can be part of a data processing server. Consistent with the present disclosure, video encoder 20 and video decoder 30 can be implemented using the computing environment 1510. The computing environment 1510 includes a processor 1520, a memory 1530, and an Input/Output (I/O) interface 1540.

The processor 1520 typically controls overall operations of the computing environment 1510, such as the operations associated with display, data acquisition, data communications, and image processing. The processor 1520 may include one or more processors to execute instructions to perform all or some of the steps in the above-described methods. Moreover, the processor 1520 may include one or more modules that facilitate the interaction between the processor 1520 and other components. The processor 1520 may be a Central Processing Unit (CPU), a microprocessor, a single chip machine, a Graphical Processing Unit (GPU), or the like.

The memory 1530 is configured to store various types of data to support the operation of the computing environment 1510. The memory 1530 may include predetermined software 1532. Examples of such data includes instructions for any applications or methods operated on the computing environment 1510, video datasets, image data, etc. The memory 1530 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1540 provides an interface between the processor 1520 and peripheral interface modules, such as a keyboard, a click wheel, buttons, or the like. The buttons may include but are not limited to, a home button, a start scan button, and a stop scan button. The I/O interface 1540 can be coupled with an encoder and decoder.

In some implementations, there is also provided a non-transitory computer-readable storage medium comprising a plurality of programs, for example, in the memory 1530, executable by the processor 1520 in the computing environment 1510, for performing the above-described methods. Alternatively, the non-transitory computer-readable storage medium may have stored therein a bitstream or a data stream comprising encoded video information (for example, video information comprising one or more syntax elements) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device comprising one or more processors (for example, the processor 1520); and the non-transitory computer-readable storage medium or the memory 1530 having stored therein a plurality of programs executable by the one or more processors, wherein the one or more processors, upon execution of the plurality of programs, are configured to perform the above-described methods.

In some implementations, there is also provided a computer program product comprising a plurality of programs, for example, in the memory 1530, executable by the processor 1520 in the computing environment 1510, for performing the above-described methods. For example, the computer program product may include the non-transitory computer-readable storage medium.

In some implementations, the computing environment 1510 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A video processing method for intra prediction in video coding with an adaptive coding order, comprising:
   receiving, by one or more processors, one or more reference blocks from a video frame of a video for performing intra prediction on a video block of the video frame;
   dividing, by the one or more processors, the video block into a plurality of video sub-blocks according to a partition structure;
   determining, by the one or more processors, the adaptive coding order for the plurality of video sub-blocks, wherein the adaptive coding order indicates an order to code the plurality of video sub-blocks, wherein the adaptive coding order is adaptively determined for the video block based on the partition structure; and
   generating, by the one or more processors, a plurality of reconstructed sub-blocks for the plurality of video sub-blocks based on the adaptive coding order and the one or more reference blocks,
   wherein the plurality of reconstructed sub-blocks form a reconstructed block for the video block,
   wherein determining the adaptive coding order for the plurality of video sub-blocks comprises:
      determining a plurality of candidate coding orders for the plurality of video sub-blocks based on the partition structure; and
      selecting the adaptive coding order from the plurality of candidate coding orders using a rate-distortion optimization.

2. The video processing method of claim 1, wherein generating the plurality of reconstructed sub-blocks for the plurality of video sub-blocks based on the adaptive coding order comprises:
   for a first video sub-block in the adaptive coding order,
      generating a first predictive sub-block for the first video sub-block based on the one or more reference blocks; and
      generating a first reconstructed sub-block for the first video sub-block based on the first predictive sub-block; and
   for a second video sub-block subsequent to the first video sub-block in the adaptive coding order,
      generating a second predictive sub-block for the second video sub-block based on the first reconstructed sub-block and the one or more reference blocks; and
      generating a second reconstructed sub-block for the second video sub-block based on the second predictive sub-block.

3. The video processing method of claim 1, further comprising:
   generating a syntax element for signaling the adaptive coding order for the plurality of the video sub-blocks.

4. The video processing method of claim 1, wherein the video block is a coding unit (CU).

5. The video processing method of claim 1, wherein the partition structure is a quaternary partition, and dividing the video block into the plurality of video sub-blocks comprises:
   performing the quaternary partition on the video block to split the video block into four video sub-blocks.

6. The video processing method of claim 5, wherein:
   the four video sub-blocks comprise a top-left video sub-block, a top-right video sub-block, a bottom-left video sub-block, and a bottom-right video sub-block; and
   the plurality of candidate coding orders comprise various sequenced combinations of the top-left video sub-block, the top-right video sub-block, the bottom-left video sub-block, and the bottom-right video sub-block.

7. The video processing method of claim 6, wherein the plurality of candidate coding orders comprise:
- a first coding order from the top-left video sub-block, the top-right video sub-block, the bottom-left video sub-block, to the bottom-right video sub-block;
- a second coding order from the bottom-left video sub-block, the top-left video sub-block, the bottom-right video sub-block, to the top-right video sub-block;
- a third coding order from the bottom-right video sub-block, the bottom-left video sub-block, the top-right video sub-block, to the top-left video sub-block;
- a fourth coding order from the top-right video sub-block, the bottom-right video sub-block, the top-left video sub-block, to the bottom-left video sub-block;
- a fifth coding order from the top-left video sub-block, the bottom-left video sub-block, the top-right video sub-block, to the bottom-right video sub-block;
- a sixth coding order from the bottom-left video sub-block, the bottom-right video sub-block, the top-left video sub-block, to the top-right video sub-block;
- a seventh coding order from the bottom-right video sub-block, the top-right video sub-block, the bottom-left video sub-block, to the top-left video sub-block; and
- an eighth coding order from the top-right video sub-block, the top-left video sub-block, the bottom-right video sub-block, to the bottom-left video sub-block.

8. The video processing method of claim 1, wherein the partition structure is a binary partition, and dividing the video block into the plurality of video sub-blocks comprises:
- performing the binary partition on the video block to split the video block into two video sub-blocks horizontally or vertically.

9. The video processing method of claim 8, wherein:
- the two video sub-blocks comprise a first video sub-block and a second video sub-block; and
- the plurality of candidate coding orders comprise a first coding order from the first video sub-block to the second video sub-block and a second coding order from the second video sub-block to the first video sub-block.

10. The video processing method of claim 1, wherein the partition structure is a ternary partition, and dividing the video block into the plurality of video sub-blocks comprises:
- performing the ternary partition on the video block to split the video block into three video sub-blocks horizontally or vertically.

11. The video processing method of claim 10, wherein:
- the three video sub-blocks comprise a first video sub-block, a second video sub-block, and a third video sub-block; and
- the plurality of candidate coding orders comprise various sequenced combinations of the first video sub-block, the second video sub-block, and the third video sub-block.

12. The video processing method of claim 11, wherein the plurality of candidate coding orders comprise:
- a first coding order from the first video sub-block, the second video sub-block, to the third video sub-block;
- a second coding order from the first video sub-block, the third video sub-block, to the second video sub-block;
- a third coding order from the second video sub-block, the first video sub-block, to the third video sub-block;
- a fourth coding order from the third video sub-block, the first video sub-block, to the second video sub-block;
- a fifth coding order from the second video sub-block, the third video sub-block, to the first video sub-block; and
- a sixth coding order from the third video sub-block, the second video sub-block, to the first video sub-block.

13. The video processing method of claim 1, wherein dividing the video block into the plurality of video sub-blocks comprises:
- applying an intra sub-partition (ISP) mode to split the video block into a plurality of sub-partitions based on the partition structure, each sub-partition comprising a corresponding one of the plurality of video sub-blocks,
- wherein the plurality of sub-partitions share a common intra prediction mode with respective transform types.

14. The video processing method of claim 13, wherein applying the ISP mode to split the video block into the plurality of sub-partitions comprises:
- splitting the video block into the plurality of sub-partitions horizontally or vertically based on the partition structure.

15. The video processing method of claim 14, wherein:
- the plurality of candidate coding orders comprise various sequenced combinations of the plurality of sub-partitions; and
- the adaptive coding order is selected from the various sequenced combinations of the plurality of sub-partitions.

16. The video processing method of claim 15, wherein:
- the partition structure indicates to divide the video block into two sub-partitions comprising a first sub-partition and a second sub-partition;
- the plurality of candidate coding orders comprise a first coding order from the first sub-partition to the second sub-partition and a second coding order from the second sub-partition to the first sub-partition; and
- the adaptive coding order is selected from the first and second coding orders.

17. The video processing method of claim 15, wherein:
- the partition structure indicates to divide the video block into four sub-partitions comprising a first sub-partition, a second sub-partition, a third sub-partition, and a fourth sub-partition;
- the plurality of candidate coding orders comprise various sequenced combinations of the first, second, third, and fourth sub-partitions; and
- the adaptive coding order is selected from the various sequenced combinations of the first, second, third, and fourth sub-partitions.

18. A video processing apparatus for intra prediction in video coding with an adaptive coding order, comprising:
- a memory coupled to one or more processors; and
- the one or more processors configured to:
    - receive one or more reference blocks from a video frame of a video for performing intra prediction on a video block of the video frame;
    - divide the video block into a plurality of video sub-blocks according to a partition structure;
    - determine the adaptive coding order for the plurality of video sub-blocks, wherein the adaptive coding order indicates an order to code the plurality of video sub-blocks, wherein the adaptive coding order is adaptively determined for the video block based on the partition structure; and
    - generate a plurality of reconstructed sub-blocks for the plurality of video sub-blocks based on the adaptive coding order and the one or more reference blocks, wherein the plurality of reconstructed sub-blocks form a reconstructed block for the video block,
    - wherein to determine the adaptive coding order for the plurality of video sub-blocks, the one or more processors are further configured to:

determine a plurality of candidate coding orders for the plurality of video sub-blocks based on the partition structure; and select the adaptive coding order from the plurality of candidate coding orders using a rate-distortion optimization.

19. The video processing apparatus of claim 18, wherein to generate the plurality of reconstructed sub-blocks for the plurality of video sub-blocks based on the adaptive coding order, the one or more processors are further configured to:

for a first video sub-block in the adaptive coding order,
generate a first predictive sub-block for the first video sub-block based on the one or more reference blocks; and generate a first reconstructed sub-block for the first video sub-block based on the first predictive sub-block; and for a second video sub-block subsequent to the first video sub-block in the adaptive coding order,
generate a second predictive sub-block for the second video sub-block based on the first reconstructed sub-block and the one or more reference blocks; and
generate a second reconstructed sub-block for the second video sub-block based on the second predictive sub-block.

20. A non-transitory computer-readable storage medium storing a bitstream formed by instructions which, when executed by a computing device having one or more processors, cause the one or more processors to perform an encoding method, wherein the bitstream is to be decoded by a decoding method, wherein each of the encoding method and the decoding method comprises:

receiving one or more reference blocks from a video frame of a video for performing intra prediction on a video block of the video frame;

dividing the video block into a plurality of video sub-blocks according to a partition structure;

determining an adaptive coding order for the plurality of video sub-blocks, wherein the adaptive coding order indicates an order to code the plurality of video sub-blocks, wherein the adaptive coding order is adaptively determined for the video block based on the partition structure; and generating a plurality of reconstructed sub-blocks for the plurality of video sub-blocks based on the adaptive coding order and the one or more reference blocks, wherein the plurality of reconstructed sub-blocks form a reconstructed block for the video block, wherein the video is stored in the non-transitory computer-readable storage medium, and wherein determining the adaptive coding order for the plurality of video sub-blocks comprises:
determining a plurality of candidate coding orders for the plurality of video sub-blocks based on the partition structure; and
selecting the adaptive coding order from the plurality of candidate coding orders using a rate-distortion optimization.

* * * * *